US010372924B2

(12) United States Patent
Madathilparambil George et al.

(10) Patent No.: US 10,372,924 B2
(45) Date of Patent: Aug. 6, 2019

(54) MASTER DEVICE FOR CONTROLLING APPLICATION SECURITY ENVIRONMENTS

(76) Inventors: George Madathilparambil George, Hyderabad (IN); Nikhil George, Hyderabad (IN)

(*) Notice: Subject to any disclaimer, the term of this patent is extended or adjusted under 35 U.S.C. 154(b) by 2866 days.

(21) Appl. No.: 12/151,853

(22) Filed: May 12, 2008

(65) Prior Publication Data

US 2009/0328155 A1    Dec. 31, 2009

(51) Int. Cl.
*G06F 9/46* (2006.01)
*G06F 21/62* (2013.01)

(52) U.S. Cl.
CPC .......... *G06F 21/6218* (2013.01); *G06F 9/468* (2013.01); *G06F 2221/2101* (2013.01); *G06F 2221/2129* (2013.01); *G06F 2221/2141* (2013.01); *G06F 2221/2147* (2013.01); *G06F 2221/2149* (2013.01); *G06F 2221/2153* (2013.01)

(58) Field of Classification Search
CPC .............................. G06F 21/6218; G06F 9/468
USPC ........ 726/4, 10, 26, 27, 2, 6, 21.26; 709/220
See application file for complete search history.

(56) References Cited

U.S. PATENT DOCUMENTS

| | | | |
|---|---|---|---|
| 6,539,480 B1 * | 3/2003 | Drews ........................... | 713/191 |
| 7,665,139 B1 * | 2/2010 | Szor et al. ..................... | 726/24 |
| 7,757,276 B1 * | 7/2010 | Lear .............................. | 726/6 |
| 2004/0268150 A1 * | 12/2004 | Aaron ........................... | 713/201 |
| 2005/0060579 A1 * | 3/2005 | Dickelman et al. .......... | 713/201 |
| 2008/0104207 A1 * | 5/2008 | Pulkkinen et al. ........... | 709/220 |
| 2008/0222734 A1 * | 9/2008 | Redlich et al. ............... | 726/26 |
| 2008/0244736 A1 * | 10/2008 | Lampson et al. ............. | 726/21 |
| 2009/0094624 A1 * | 4/2009 | Craft et al. ................... | 719/331 |
| 2009/0119773 A1 * | 5/2009 | D'Amore et al. ............ | 726/21 |
| 2009/0222903 A1 * | 9/2009 | Sherkin et al. ............... | 726/10 |
| 2009/0328225 A1 * | 12/2009 | Chambers et al. ............ | 726/26 |

* cited by examiner

*Primary Examiner* — Farid Homayounmehr
*Assistant Examiner* — Suman Debnath

(57) ABSTRACT

Computer protection is weak with the methods currently available and there are risks of malicious users getting access to computers, corrupting important data, including system data. We are proposing a method for improving access protection, more particularly, by using a slave device that will enable or disable protection for applications as required. The device supports one or more users, none or more user groups, none or one or more Application Security Environments for each user or user group and one or more states for each Application Security Environment. The state of the hardware is manually controlled by the users. Depending on the configuration, each hardware state corresponding to an Application Security Environment corresponds to a set of privileges the processes running in that Application Security Environment have while that Application Security Environment is in that state.

5 Claims, 15 Drawing Sheets

MASTER DEVICE FOR CONTROLLING APPLICATION SECURITY ENVIRONMENTS

BACKGROUND OF THE INVENTION

This invention relates to creating one or more highly secure application security environments in computing systems. An Application Security Environment is an environment in which a user or a group of users can run one or more tasks or one or more processes or one or more applications and in which the privileges of the tasks or processes or applications run by a user or a user group can be more constrained than the privileges of the user or the user group. An application could consist of one or more tasks or processes. A process could consist of one or more threads.

Current technologies provide protection using operating system software and a malicious program or user can get access as a privileged user with limited access restrictions and run programs on behalf of other users or read confidential user data or corrupt user data. It requires hardware support to provide complete protection for user data from malicious programs.

There are different methods for access control such as non-privileged users in UNIX or Windows operating systems who cannot execute privileged instructions or access all parts of volatile or non-volatile memories (storage). But a malicious program or user can sometimes exploit security weaknesses in an operating system, to get access as a privileged user. This will allow malicious users to impersonate privileged users and gain access to critical data belonging to other users or corrupt users' data. The security systems in UNIX and Windows operating systems do not allow limiting privileges assigned to a privileged user.

A high level of application protection is provided by Application Security Environments such as Solaris containers and HPUX Security Containers. Each container ideally has only a subset of the privileges and compromising the security of most of the containers poses only a limited risk. However, when either the operating system security is compromised or when the security of a container that is used to create other containers is compromised, it will result in significant risk to both the computer users' identity and data.

There is a serious risk to users' data and users' identity when their laptops are stolen or when someone gains access to a user's computer in the user's absence.

There is a serious risk to users' data and users' identity when a privileged user is malicious. The privileged user may create containers that compromise both users' identity and users' data.

There are many methods for protecting computer users and user data which do not require manual action for enabling and disabling protection; Such protections can be compromised by malicious privileged users or by malicious programs by emulating the required software behavior.

U.S. Pat. No. 6,330,648 illustrates a method of adding protection against malicious programs by using a manually controlled hardware with two states. By default the protection is enabled and has a mechanism to manually switch off the protection. This invention will not be able to provide protection for portions of storage belonging to each Application Security Environment, as is possible using our invention. In addition, manual action can enable only one hardware. So for a system administrator who wants to install a software update on a large number of machines in a data center, the solution provided by this invention is very cumbersome and requires the system administrator to manually disable protection for each computer the administrator needs to update. Another drawback of the invention is that the solution cannot be used with mass memories which are already manufactured.

US Patent Application 20060117156 illustrates a method of adding protection for non-volatile memories against malicious programs by using a manually controlled hardware with two or more states, but only two states are used for protection. One state has protection enabled and the other state has protection disabled. This invention will not be able to provide protection for portions of storage belonging to each Application Security Environment, as is possible using our invention. In addition, manual action can enable only one hardware. So for a system administrator who wants to install a software update on a large number of machines in a data center, the solution provided by this invention is very cumbersome and requires the system administrator to manually disable protection for each computer the administrator needs to update.

U.S. patent application Ser. Nos. 11/514,807, 11/515,619 and 11/519,178 illustrate different manually controlled hardware solutions that protect data on mass-memories for each user. These patent applications propose dividing mass-memories into different areas and protecting these areas against malicious access. But these solutions cannot provide fine grained protection for each Application Security Environment. The privileges get enabled at user level and if any of the programs that are run by a user is malicious when the state corresponding to the user corresponds to low protection, it can cause serious risk to the user's data and user's identity.

FIG. 1 shows an example of a computer 01001 with multiple users and multiple Application Security Environments each containing multiple processes. There are 3 Application Security Environments in the computer. Application Security Environment P 01002 contains two processes A 01005 and D 01006. Application Security Environment Q 01003 contains two processes C 01007 and E 01008. Application Security Environment R 01004 contains two processes B 01009 and F 01010. The Application Security Environment P 01002 and Q 01003 are owned by User Y 01011. The Application Security Environment R 01004 is owned by User Group X 01012.

BRIEF SUMMARY OF THE INVENTION

It is the object of the present invention to use a slave device which supports one or more Application Security Environments and supports one or more states for each Application Security Environment so that protection for the Application Security Environments can be improved. The device may be implemented in hardware or as a combination of hardware and firmware. This device is referred to as a Slave Application Security Environment Protection Device or SASEPDevice. Each SASEPDevice is controlled by one or more master devices. It requires a manual action on a master device which controls a SASEPDevice to initiate an operation in that SASEPDevice. These operations will be completed only if the user who performs the manual action has the required privileges. The master device is also used to authenticate the user who performs a manual action. We refer to the master device on which manual actions are done as the Application Security Environment Protection Master Device or ASEPMasterDevice. The state of an Application Security Environment is referred to as Application Security Environment State. Each Application Security Environment is owned by a user or a group of users and only the owners of an Application Security Environment can run processes/ tasks in that Application Security Environment. The privileges of the processes/tasks run in an Application Security Environment will be a subset of the privileges of the user or the user group who owns that Application Security Environment. The privileges that the processes/tasks which run in an Application Security Environment have will depend on the state of that Application Security Environment. The user or the members of the user group who own an Application Security Environment are referred to as Application Security Environment Owners or ASEOs. Some users are grouped to create user groups. Each state of an Application Security Environment corresponds to or maps to a set of privileges that the processes/tasks/threads running in that Application Security Environment have when that Application Security Environment is in that state. This set of privileges corresponding to or mapping to an Application Security Environment State must be a subset of the privileges of the corresponding ASEOs. This mapping from a state of an Application Security Environment to a set of privileges that the processes/tasks/threads running in that Application Security Environment have when that Application Security Environment is in that state, is referred to as Application Security Environment State Mapping. Preferably, it requires a manual action on an ASEPMasterDevice to:

i. Create or delete a user in one or more SASEPDevices and in one or more ASEPMasterDevices;
ii. Create or delete a user group in one or more SASEPDevices and in one or more ASEPMasterDevices;
iii. Add a user to or remove a user from a user group;
iv. Create or delete an Application Security Environment in one or more SASEPDevices and in one or more ASEPMasterDevices;
v. Create or delete an Application Security Environment State;
vi. Change the state corresponding to an Application Security Environment;
vii. Create or modify or delete an Application Security Environment State Mapping;
viii. Divide mass-memories into Regions which can be protected by SASEPDevices;
ix. Assign privileges to users and user groups including access to Regions of mass-memories
x. Create or modify or delete a list of the SASEPDevices controlled by an ASEPMasterDevice
xi. Create or modify or delete properties of one or more SASEPDevices including the type of system each of the SASEPDevices is connected to and the information on authenticating each of those SASEPDevices;
xii. Create or modify or delete properties of one or more ASEPMasterDevices including the information on authenticating each of those ASEPMasterDevices;

These operations will be completed only if the user who makes the manual action is authenticated and has the required privileges. We refer to the manual action on the ASEPMasterDevice to initiate these operations as Application Security Environment Protection Manual Action or ASEPManualAction.

The ASEPManualAction on an ASEPMasterDevice may be pressing one or more buttons and/or toggling the position of one or more switches and/or turning a wheel and/or changing one or more jumper positions and/or any other manual action accepted by the ASEPMasterDevice.

The SASEPDevice interacts with the software running on the computer to which it is attached to perform the operations requested by users by performing ASEPManualActions. This software is referred to as Application Security Environment Protection Software or ASEPSoftware. The ASEPMasterDevices and the SASEPDevices and the ASEPSoftware may use unique identifiers to identify operations requested by users by performing ASEPManualActions. These unique identifiers are referred to as Unique Identifiers.

As file system permissions and ownership are based on users and user groups, the protection provided for file operations will be based on users and user groups. The proposed invention does not handle protection for file system operations. All other privileged operations are handled by the proposed invention.

A SASEPDevice can be used for enforcing privileges for processes/tasks/threads in an Application Security Environment when the processes/tasks/threads do privileged operations such as executing a privileged instruction, making a privileged system call, calling a privileged function, accessing an area or a Region of mass-memories such as hard discs, storage arrays, etc. Privileged instructions include instructions to do an input/output operation to a device attached to a computer.

To protect data on mass-memories using ASEPMasterDevices and SASEPDevices, the mass-memories are divided into Regions or areas as proposed in U.S. patent application Ser. Nos. 11/514,807, 11/515,619 and 11/519,178. Read and write access to each Region is allowed or denied for processes/tasks/threads running in each Application Security Environment based on the set of permissions that is mapped to the current state of the Application Security Environment.

The software, firmware and hardware that implement access protection fail a privileged operation which does not meet the access restrictions corresponding to the current state of the Application Security Environment from which the privileged operation is initiated. The software, firmware and hardware which implement access protection by checking the Application Security Environment State Mapping for the current state of an Application Security Environment is called Application Security Environment Protection Implementers or ASEPImplementers.

Preferably, a part of or all of the configuration required for enforcing protection based on the proposed invention must be kept in SASEPDevices and/or ASEPMasterDevices. These include the configuration for users, user groups, Application Security Environments, Application Security Environment States and Application Security Environment State Mappings, the list of the SASEPDevices controlled by each ASEPMasterDevice, the information on the type of system to which each SASEPDevice is attached and the information on authenticating each SASEPDevice and each ASEPMasterDevice.

When an ASEPMasterDevice controls more than one SASEPDevice each connected to a different computer, it may be required to synchronize state changes and configuration changes between all or some of those SASEPDevices so that all or some of those SASEPDevices are in the same Application Security Environment State for a given Application Security Environment and all or part of the configuration present in all or some of those SASEPDevices are synchronized.

DETAILED DESCRIPTION OF THE INVENTION

Figure 1:
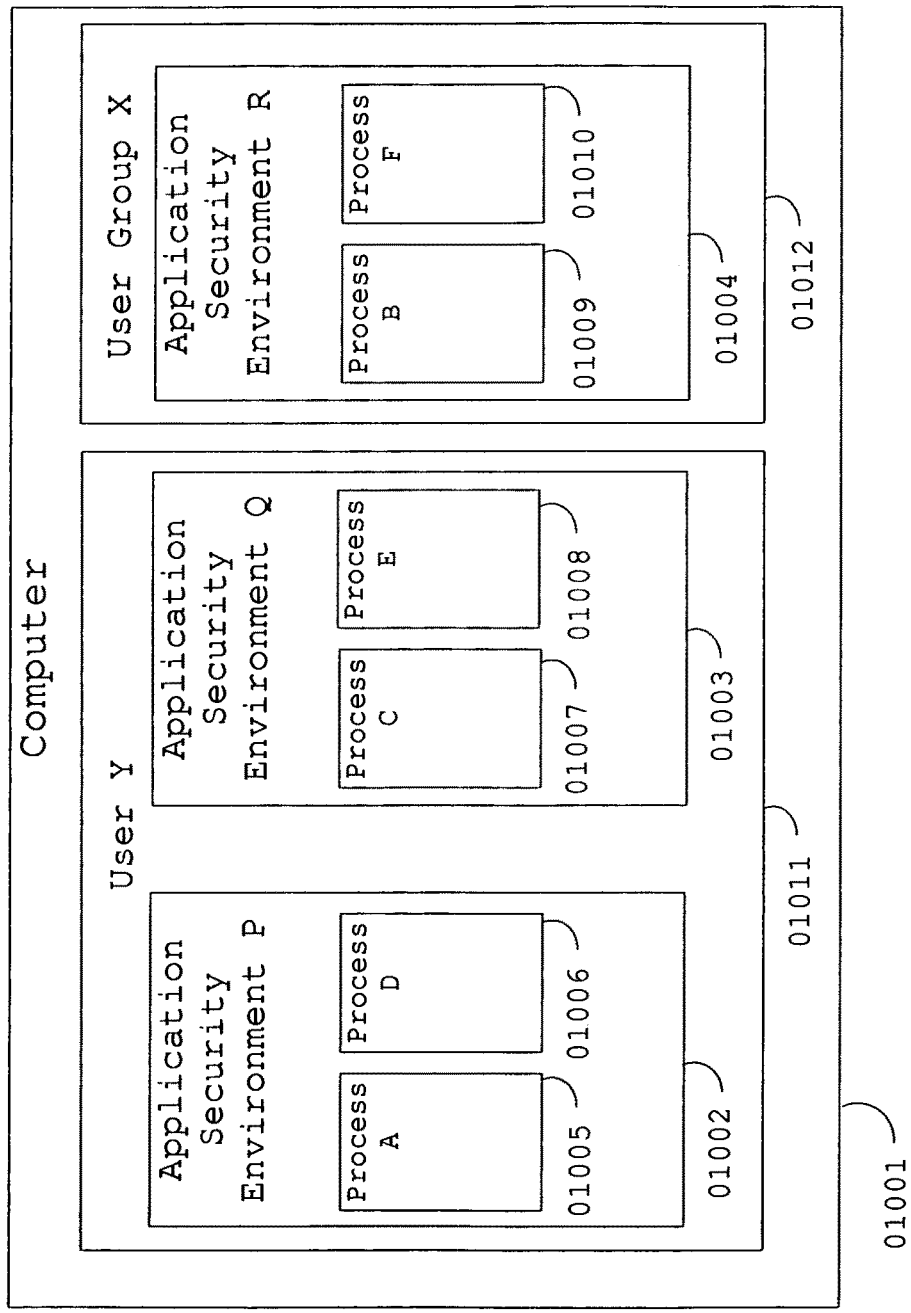
FIG. 1 illustrates a computer system with different Application Security Environments each owned by a user or a user group.

According to the invention, one or more ASEPMasterDevices or ASEPSoftware or a combination of one or more ASEPMasterDevices and ASEPSoftware allow:

i. A privileged user to create or delete users in one or more SASEPDevices and in one or more ASEPMasterDevices;

ii. A privileged user to create or delete user groups in one or more SASEPDevices and in one or more ASEPMasterDevices;

iii. A privileged user to add users to or remove users from a user group;

iv. A privileged user to assign privileges for users or user groups;

v. A user to create or delete Application Security Environments owned by that user in one or more SASEPDevices and one or more ASEPMasterDevices;

vi. All or some members of a user group to create or delete Application Security Environments owned by that user group in one or more SASEPDevices and one or more ASEPMasterDevices;

vii. Some privileged users to create or delete Application Security Environments owned by a user or by a user group in one or more SASEPDevices and one or more ASEPMasterDevices;

viii. A user to create or delete Application Security Environment States for an Application Security Environment owned by that user;

ix. All or some members of a user group to create or delete Application Security Environment States for an Application Security Environment owned by that user group;

x. Some privileged users to create or delete Application Security Environment States for an Application Security Environment;

xi. A user to create or modify or delete an Application Security Environment State Mapping for an Application Security Environment State of an Application Security Environment owned by that user;

xii. All or some members of a user group to create or modify or delete an Application Security Environment State Mapping for an Application Security Environment State of an Application Security Environment owned by that user group;

xiii. Some privileged users to create or modify or delete an Application Security Environment State Mapping for an Application Security Environment State of an Application Security Environment;

xiv. Some privileged users to create or modify or delete a list of the SASEPDevices controlled by an ASEPMasterDevice;

xv. Some privileged users to create or modify or delete properties of one or more SASEPDevices including the type of system each of those SASEPDevices is connected to and the information on authenticating each of those SASEPDevices;

xvi. Some privileged users to create or modify or delete properties of one or more ASEPMasterDevices including the information on authenticating each of those ASEPMasterDevices.

A user or user group can own none or one or more Application Security Environments.

An Application Security Environment can have one or more states. This allows privileges to be enabled for an Application Security Environment only when one or more Applications need to be run in that Application Security Environment. This significantly enhances the security of the computing systems. Similarly, this allows privileges to be enabled based on the requirements of the application being run in an Application Security Environment.

The state of an Application Security Environment can be changed only by using an ASEPMasterDevice.

The privileges of an Application Security Environment owned by an ASEO must be a subset of the privileges of that ASEO. Preferably, only an ASEO of an Application Security Environment should be allowed to configure access restrictions for processes/tasks in that Application Security Environment corresponding to different states of that Application Security Environment.

The privileges assigned to different users or groups are not mutually exclusive.

When an Application Security Environment State Mapping is created, an ASEPSoftware or a SASEPDevice or an ASEPMasterDevice verifies whether the privileges corresponding to the Application Security Environment State exceed the privileges of the user or user group who owns that Application Security Environment. Preferably, if the privileges corresponding to an Application Security Environment State exceed the privileges of the user or user group who owns the Application Security Environment, the Application Security Environment State Mapping is discarded and the user who tried to create the mapping gets an error. Optionally, the privileges in the Application Security Environment State Mapping which is being created that exceed the privileges of the user or user group who owns the Application Security Environment are discarded and the rest of the mapping is allowed.

The configuration used by ASEPMasterDevices, SASEPDevices and ASEPSoftware contains:

i. The list of users supported by each SASEPDevice;
ii. The list of users supported by each ASEPMasterDevice;
iii. The list of user groups supported by each SASEPDevice;
iv. The list of user groups supported by each ASEPMasterDevice;
v. The list of users in each user group;
vi. The set of privileges each user or each user group has;
vii. The list of Application Security Environments owned by each user or user group in each SASEPDevice;
viii. The list of Application Security Environments owned by each user or user group in each ASEPMasterDevice;
ix. The list of states for each Application Security Environment;
x. The list of Regions of mass-memories which are protected by ASEPMasterDevices and SASEPDevices;
xi. The Application Security Environment State Mapping for each Application Security Environment State;
xii. For the operations that need synchronization between SASEPDevices, the list of SASEPDevices that must participate in synchronization for each operation; For each operation that needs synchronization, this list is the same as the list of SASEPDevices attached to computers which must perform cleanup for that operation;
xiii. For the operations that need synchronization between SASEPDevices, the list of SASEPDevices that must perform each operation; All the SASEPDevices containing configurations or Application Security Environment States that will be affected by an operation must perform that operation;
xiv. Optionally, for the operations that need synchronization between SASEPDevices, the list of SASEPDevices that must discard each operation; Preferably, this list for an operation is same as the list of SASEPDevices that must participate in the synchronization for that operation;
xv. For operations that do not need synchronization between SASEPDevices, the list of SASEPDevices that must perform each operation; All the SASEPDevices containing configurations or Application Security Environment States that will be affected by an operation must perform that operation;
xvi. For each operation, the list of ASEPMasterDevices to which acknowledgments must be sent by SASEPDevices after that operation is performed; All the ASEPMasterDevices containing configurations or Application Security Environment States that will be affected by an operation must receive acknowledgments for that operation;
xvii. The list of the SASEPDevices controlled by each ASEPMasterDevice;
xviii. The properties of SASEPDevices including the type of system each SASEPDevice is connected to and the information on authenticating each SASEPDevice;
xix. The properties of the ASEPMasterDevice including the information on authenticating each ASEPMasterDevice;

The configuration may be stored in one or more ASEPMasterDevices and/or one or more SASEPDevices and/or one or more other devices which are attached to or are part of one or more computers to each of which one or more SASEPDevices are attached. The device attached to a computer storing this configuration may be a mass-memory. Optionally, the configuration could be distributed among these devices. Optionally, two or more copies of the configuration could be on these devices.

Preferably, the configuration must be kept in SASEPDevices and ASEPMasterDevices and updates to the configuration must be allowed only through ASEPManualActions. Preferably, the configuration kept in SASEPDevices must be in registers/memory not writable by a computer.

Optionally, if the configuration is kept in devices other than SASEPDevices and ASEPMasterDevices then preferably, only ASEPSoftware must have write access to the configuration.

Optionally, when the configuration can be changed without a user performing an ASEPManualAction, writes and reads of the configuration must be protected by ASEPImplementers and and one or more SASEPDevices.

The verification performed by an ASEPImplementer to verify whether a process/task in an Application Security Environment can do a privileged operation may involve both reading registers/memory of a SASEPDevice to fetch the current state of the Application Security Environment and verification by the ASEPImplementer against the configuration. If the configuration is stored in a SASEPDevice, the ASEPImplementer can verify whether an operation is permitted by reading the SASEPDevice registers/memory. If the configuration is stored in a separate device, the ASEPImplementer must fetch the current state of the Application Security Environment and the Application Security Environment State Mapping for that state to determine whether the operation is permitted in the current state of that Application Security Environment. Preferably, every privilege has an identifier which makes searching for a given privilege in an Application Security Environment State Mapping simple.

Reading and writing to the configuration are privileged operations. Preferably, when the configuration is kept in SASEPDevices, only SASEPDevices and/or ASEPMasterDevices must have write access to the configuration.

Preferably, write access to the configuration of an Application Security Environment must be given only to the owners (ASEOs) of that Application Security Environment.

Only one or more privileged users can have privileges to create or delete users or to create or delete User groups or to add or remove users to or from a user group or to assign privileges to users or user groups or to create or delete the list of SASEPDevices controlled by each ASEPMasterDevice or to create or delete or modify properties of SASEPDevices including the type of system to which each SASEPDevice is connected and information on how to authenticate each SASEPDevice or to create or delete or modify properties of ASEPMasterDevices including the information on how to authenticate each ASEPMasterDevice. Hence, preferably, write access to the configuration containing the list of users, the list of user groups, the list of users in each user group, the privileges of each user or each user group, the list of SASEPDevices controlled by each ASEPMasterDevice, properties of each SASEPDevice and properties of each ASEPMasterDevice must be given only to one or more privileged users.

Optionally, when the configuration is not kept in SASEPDevices, only ASEPSoftware must have write access to the configuration.

When a user performs an ASEPManualAction and the operation is not discarded by the ASEPMasterDevice, the details of the operation corresponding to the ASEPManualAction and optionally, an identifier for the user who performed the ASEPManualAction are communicated to one or more SASEPDevices by the ASEPMasterDevice. Each of these SASEPDevices communicates these details of the operation and the user identifier to the computer if any, to which the SASEPDevice is attached by writing to the registers/memory readable by the computer if that operation is not discarded by that SASEPDevice.

The ASEPImplementers must be capable of identifying the Application Security Environment from which a process/task/thread is attempting to execute a privileged instruction/function/system call or access portions of mass memories. Optionally, the operating system should be able to tag every privileged operation with the identifier of the Application Security Environment from which the privileged operation is being executed.

For most of the operations requested by users through ASEPManualActions, the ASEPSoftware needs to do a cleanup and update of data structures before a SASEPDevice is allowed to complete those operations. The cleanup may involve flushing dirty buffers in file system buffer caches and/or cleaning up data structures. For example, the ASEPSoftware may need to flush dirty buffers in file system buffer caches and/or clean up data structures corresponding to the old privileges as the new set of privileges may block access to these buffers and data for processes/tasks/threads in the Application Security Environment.

The message sent by a SASEPDevice to another device to indicate that an operation requested was completed successfully is referred to as an Acknowledgment or ACK. The message sent by a SASEPDevice to another device to indicate that an operation requested could not be completed successfully is referred to as a Negative Acknowledgment or NAK. The commands sent by an ASEPMasterDevice to one or more SASEPDevices to initiate an operation when a user requests that operation by performing an ASEPManualAction is referred to as the Master Commands.

Figure 2:
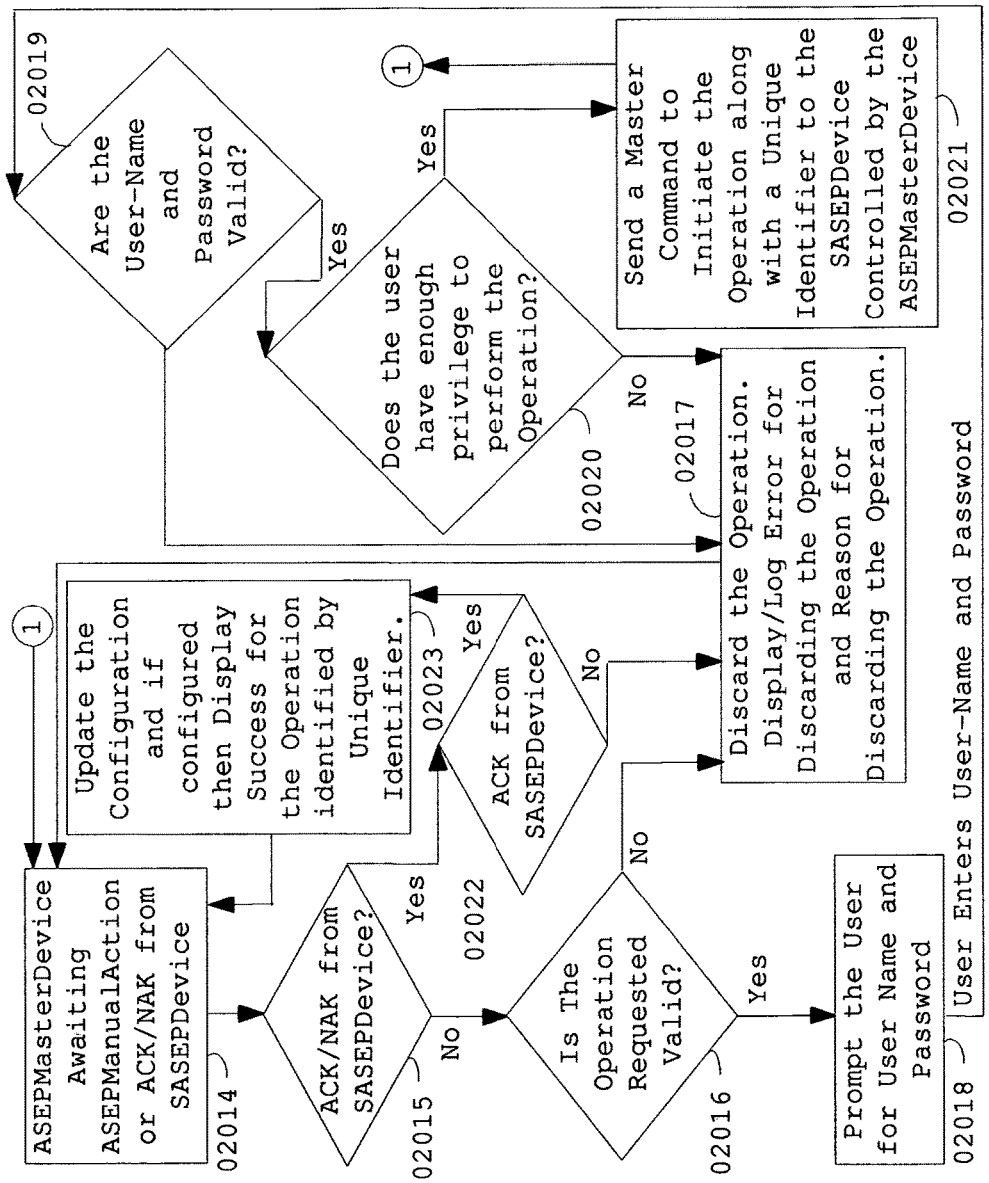
FIG. 2 illustrates an example of a state machine of an ASEPMasterDevice which checks validity of operations requested by users by performing ASEPManualActions.

FIG. 2 illustrates an example of a state machine of an ASEPMasterDevice that accepts ASEPManualAction. The configuration is also stored in this ASEPMasterDevice and hence the firmware running on the ASEPMasterDevice can determine whether an operation requested by a user by performing an ASEPManualAction is valid or not and whether a user has the privileges to perform an operation requested by that user by performing an ASEPManualAction. The ASEPMasterDevice awaits 02014 an ASEPManualAction from a user or an Acknowledgment (ACK) or Negative Acknowledgment (NAK) from the SASEPDevice controlled by the ASEPMasterDevice. The ASEPMasterDevice checks the type of input 02015, whether an ASEPManualAction or a ACK/NAK from a SASEPDevice is received. When a user performs an ASEPManualAction, the ASEPMasterDevice checks 02016 whether the operation requested by the user by performing the ASEPManualAction is valid as per the configuration. If the operation requested is invalid 02017, the ASEPMasterDevice discards the operation, displays an error message for discarding the operation along with the reason for discarding the operation (invalid operation), logs the error and goes back to the state 02014 where the ASEPMasterDevice awaits an ASEPManualAction from a user or an Acknowledgment (ACK) or a. Negative Acknowledgment (NAK) from the SASEPDevice. If the operation is valid 02018, the ASEPMasterDevice prompts 02018 the user who performed the ASEPManualAction for the user name and password. When the user enters the user name and password, the user name and password are validated 02019. If the validation fails 02017, the ASEPMasterDevice discards the operation, displays an error message for discarding the operation along with the reason for discarding the operation (invalid user-name/password), logs the error and goes back to the state 02014 where the ASEPMasterDevice awaits an ASEPManualAction from a-user or an Acknowledgment (ACK) or Negative Acknowledgment (NAK) from the SASEPDevice. If the user name and password are valid, the ASEPSoftware checks whether the user has the privilege 02020 to perform the operation requested by the user by performing the ASEPManualAction. If the user does not have the required privilege 02017, the ASEPMasterDevice discards the operation, displays an error message for discarding the operation along with the reason for discarding the operation (insufficient privilege), logs the error and goes back to the state 02014 where the ASEPMasterDevice awaits an ASEPManualAction from a user or an Acknowledgment (ACK) or Negative Acknowledgment (NAK) from the SASEPDevice. If the user has the required privilege to perform the operation 02021, the ASEPMasterDevice sends a Master Command to the SASEPDevice controlled by it. The Master Command contains the details of the operation requested by the user by performing the ASEPManualAction and a Unique Identifier for that operation. Then the ASEPMasterDevice goes back to the state 02014 where the ASEPMasterDevice awaits an ASEPManualAction from a user or an Acknowledgment (ACK) or Negative Acknowledgment (NAK) from the SASEPDevice. When an Acknowledgment (ACK) or Negative Acknowledgment (NAK) from the SASEPDevice is received, the ASEPMasterDevice checks 02022 whether it is an Acknowledgment (ACK) from the SASEPDevice. If it is not an Acknowledgment (ACK) 02017, the ASEPMasterDevice discards the operation, displays an error message for discarding the operation along with the reason for discarding the operation (Negative Acknowledgment (NAK) from the SASEPDevice), logs the error and goes back to the state 02014 where the ASEPMasterDevice awaits an ASEPManualAction from a user or an Acknowledgment (ACK) or Negative Acknowledgment (NAK) from the SASEPDevice. When an Acknowledgment (ACK) from the SASEPDevice is received 02023 indicating that the SASEPDevice performed an operation, the ASEPMasterDevice updates the configuration with information contained in the Acknowledgment (ACK), displays a message if the ASEPMasterDevice is configured to display success for that operation and goes back to the state 02014 where the ASEPMasterDevice awaits an ASEPManualAction from a user or an Acknowledgment (ACK) or Negative Acknowledgment (NAK) from the SASEPDevice. The Acknowledgments (ACKs) for a successfully completed operation are sent to one or more ASEPMasterDevices so that configurations in all those ASEPMasterDevices are synchronized. So an ASEPMasterDevice need not display a message whenever an Acknowledgment is received. Whether a message will be displayed by an ASEPMasterDevice for an operation requested by a user using another ASEPMasterDevice will depend on the privileges of the user of that ASEPMasterDevice and the configuration. The success message is displayed if the successful operation was initiated on that ASEPMasterDevice so that the user knows that the operation that user initiated has been successfully completed.

When an ASEPMasterDevice controls more than one SASEPDevice for some operations, as part of performing an ASEPManualAction a user should identify the SASEPDevice which should handle the operation requested by that ASEPManualAction. Preferably, for most of the operations, an ASEPMasterDevice should able to identify (based on the configuration) the SASEPDevice to which an operation requested by a user by performing an ASEPManualAction should be communicated. In this case, there is no need for a user to identify the SASEPDevice which should handle the operations from such ASEPManualActions.

Preferably, there should be one ASEPMasterDevice for each user. When every user has an ASEPMasterDevice, there is no need to enter the user's name as part of user authentication.

Preferably, an ASEPMasterDevice and a SASEPDevice controlled by it must use strong encryption for all communication. Preferably, a different encryption key should be used for different blocks of time. The encryption technology, time period for which a key is valid, etc., are implementation specific.

Preferably, an ASEPMasterDevice and the SASEPDevice controlled by it communicates using wireless communication.

Optionally, an ASEPMasterDevice may be connected to one or more SASEPDevices it controls through wired connections. In this case, the ASEPMasterDevice and the SASEPDevices which have wired connection may use wired communication and not wireless communication.

Optionally, an ASEPMasterDevice communicates with some of the SASEPDevices controlled by it using wired communication and with rest of the SASEPDevices controlled by it using wireless communication.

There are different options for communication between an ASEPMasterDevice and each SASEPDevice it controls. One option is to establish a logical connection to send a Master Command or an Acknowledgment (ACK) or a Negative Acknowledgment (NAK) or other messages. The recommended option is to have a permanent logical connection established between an ASEPMasterDevice and each SASEPDevice controlled by it. Another option is to use temporary connections. If the temporary connection could not be established, the ASEPMasterDevice may retry the connection until the maximum number of retries expires. Another option is to use connectionless communication. In this case, preferably there has to be acknowledgment for each message exchanged between the ASEPMasterDevice and the SASEPDevice and message retries to ensure that communication of each message is successful. Unicast or broadcast or multicast communication can be used for different messages exchanged between an ASEPMasterDevice and a SASEPDevice. Optionally, connection oriented communication can be used for some of the messages exchanged between an ASEPMasterDevice and a SASEPDevice and connectionless unicast or broadcast or multicast communication for other messages. The method used for communication between an ASEPMasterDevice and a SASEPDevice controlled by it, is implementation specific.

Preferably, an ASEPMasterDevice must authenticate a SASEPDevice when that SASEPDevice sends an Acknowledgment (ACK) or a Negative Acknowledgment (NAK) or other messages to that ASEPMasterDevice. Preferably, a SASEPDevice must authenticate an ASEPMasterDevice when that ASEPMasterDevice sends Master Commands or other messages to that SASEPDevice.

The ASEPManualAction on an ASEPMasterDevice may be pressing one or more buttons and/or toggling the position of one or more switches and/or turning a wheel and/or changing one or more jumper positions and/or any other ASEPManualAction supported by the ASEPMasterDevice. Preferably, every ASEPMasterDevice must have a display screen where the user can see the inputs the user has entered.

An ASEPManualAction can be for:
  i. Creating or deleting one or more users in one or more SASEPDevices and one or more ASEPMasterDevices or
  ii. Creating or deleting one or more user groups in one or more SASEPDevices and one or more ASEPMasterDevices or
  iii. Creating or deleting one or more Application Security Environments owned by a user or a user group in one or more SASEPDevices and one or more ASEPMasterDevices or
  iv. Creating or deleting one or more Application Security Environment States for an Application Security Environment or
  vii. Dividing mass-memories into Regions which can be protected by ASEPMasterDevices and SASEPDevices or
  viii. Assigning privileges to users and user groups including access to Regions of mass-memories or
  v. Adding users to or removing users from a user group or
  vi. Changing the state of an Application Security Environment or
  ix. Creating or modifying or deleting Application Security Environment State Mappings for an Application Security Environment or
  x. Creating or modifying or deleting a list of the SASEPDevices controlled by an ASEPMasterDevice or
  xi. Creating or modifying or deleting properties of one or more SASEPDevices including the type of system each of those SASEPDevices is connected to and the information on authenticating each of those SASEPDevices;
  xii. Creating or modifying or deleting properties of one or more ASEPMasterDevices including the information on authenticating each of those ASEPMasterDevices;

A privileged user can perform an ASEPManualAction to:
  i. Create or delete one or more users in one or more SASEPDevices and one or more ASEPMasterDevices or
  ii. Create or delete one or more user groups in one or more SASEPDevices and one or more ASEPMasterDevices or
  iii. Add one or more users to or remove one or more users from a user group or
  iv. Assign privileges to one or more users or user groups or v. Create or delete one or more Application Security Environments owned by a user Or a user group in one or more SASEPDevices and one or more ASEPMasterDevices or vi. Create or delete one or more Application Security Environment States for an Application Security Environment or vii. Change the state of an Application Security Environment or viii. Divide mass-memories into Regions which can be protected by ASEPMasterDevices and SASEPDevices or ix. Create or modify or delete one or more Application Security Environment State Mappings for an Application Security Environment or x. Create or modify or delete a list of the SASEPDevices controlled by an ASEPMasterDevice or xi. Create or modify or delete properties of one or more SASEPDevices including the type of system each of those SASEPDevices are connected to and the information on authenticating each of those SASEPDevices;

xii. Create or modify or delete properties of one or more ASEPMasterDevices including the information on authenticating each of those ASEPMasterDevices;

A user can perform an ASEPManualAction to:

i. Create or delete one or more Application Security Environments owned by that user or by one of that user's groups in one or more SASEPDevices and one or more ASEPMasterDevices or ii. Create or delete one or more Application Security Environment States for an Application Security Environment owned by that user or by one of that user's groups or iii. Change the state of an Application Security Environment owned by that user or by one of that user's groups or iv. Create or modify or delete one or more Application Security Environment State Mappings for an Application Security Environment owned by that user or by one of that user's groups.

Optionally, some of the actions for each of the operations can be done using an ASEPMasterDevice and the rest of the actions for the same operation can be done using ASEPSoftware.

Optionally, some of these operations can be done using ASEPSoftware and rest of the operations can be done by doing ASEPManualActions on ASEPMasterDevices.

Optionally, some of these operations can be done using software running on one or more computers and the rest of the operations can be done by doing ASEPManualActions on ASEPMasterDevices.

Optionally, an ASEPManualAction specifies only one operation such as adding one user or deleting one user, etc.

Preferably, the Unique Identifier for an operation is such that some bits of the Unique Identifier identifies the ASEPMasterDevice on which the ASEPManualAction for that operation was performed.

Optionally, when an ASEPManualAction specifies more than one operation, none of those operations will be allowed to proceed if the user does not have the privilege to perform any of those operations. This is not a recommended option.

Optionally, when an ASEPManualAction specifies more than one operation, only those operations will not be allowed to proceed for which the user does not have the privilege to perform the operations. This is not a recommended option.

For the rest of the description of the invention, it is assumed that an ASEPManualAction specifies only one operation; However, creating multiple users or creating multiple Application Security Environments for a user, etc. is considered a single operation.

Invalid operations include adding a user to a non-existent user group, creating an Application Security Environment owned by a non-existent user or owned by a non-existent user group, creating a new state for a non-existent Application Security Environment, creating or modifying an Application Security Environment State Mapping for a non-existent Application Security Environment State, creating or modifying an Application Security Environment State Mapping such that the privileges corresponding to an Application Security Environment State exceed the privileges of the corresponding ASEOs, adding a user to or deleting a user from a non-existent SASEPDevice, adding a user group to or deleting a user group from a non-existent SASEPDevice, adding an Application Security Environment to or deleting an Application Security Environment from a non-existent SASEPDevice, adding a non-existent SASEPDevice to a list of SASEPDevices controlled by an ASEPMasterDevice, adding or modifying properties of non-existent SASEPDevices or ASEPMasterDevices, etc.

The ability of an ASEPMasterDevice to detect invalid operations is implementation specific. Optionally, a SASEPDevice or ASEPSoftware can be used for detecting some or all invalid operations. Optionally, ASEPSoftware can use a peripheral device other than the SASEPDevice for detecting invalid operations.

The set of operations supported by an ASEPMasterDevice is implementation specific. But all ASEPMasterDevices must support one or more Application Security Environments and one or more states for each Application Security Environment.

Different ASEPMasterDevices could have different behaviors while accepting user-names and passwords. If the user-name/password entered by a user is invalid, the ASEPMasterDevice could prompt the user for the user-name/password again and accept a new user-name/password from the user until a valid user-name/password is received or until the maximum number of password retries is reached or until the user cancels the request to re-enter the password. The ASEPMasterDevice that supports user-name/password retries, will discard an operation corresponding to an ASEPManualAction due to user authentication failure only if a valid user-name/password is not received even after the maximum number of user-name/password retries or if the user cancels the user-name/password retry.

The method used by an ASEPMasterDevice for authenticating a user using user-name/password or password is implementation specific.

An ASEPMasterDevice may use other options for authenticating a user, such as finger print validation, retina validation, or other current and future technologies for user authentication. An ASEPMasterDevice may also use a combination of two or more methods of user authentication such as user-name validation, password validation, finger print validation, retina validation, etc., for authenticating the user who performed an ASEPManualAction. The method used by an ASEPMasterDevice for authenticating a user is implementation specific.

Some ASEPMasterDevices may use a timeout while performing user authentication. In this case, if the user authentication does not complete before the timeout expires, the ASEPMasterDevice will fail the user authentication and discard the operation.

The order in which the validation of an operation requested by a user by performing an ASEPManualAction, the user authentication for that operation, the check to verify whether the user who initiated that operation has sufficient privileges to perform that operation and the check to detect whether that operation has conflict with any ongoing operations are done by an ASEPMasterDevice, is implementation specific.

Figure 3:
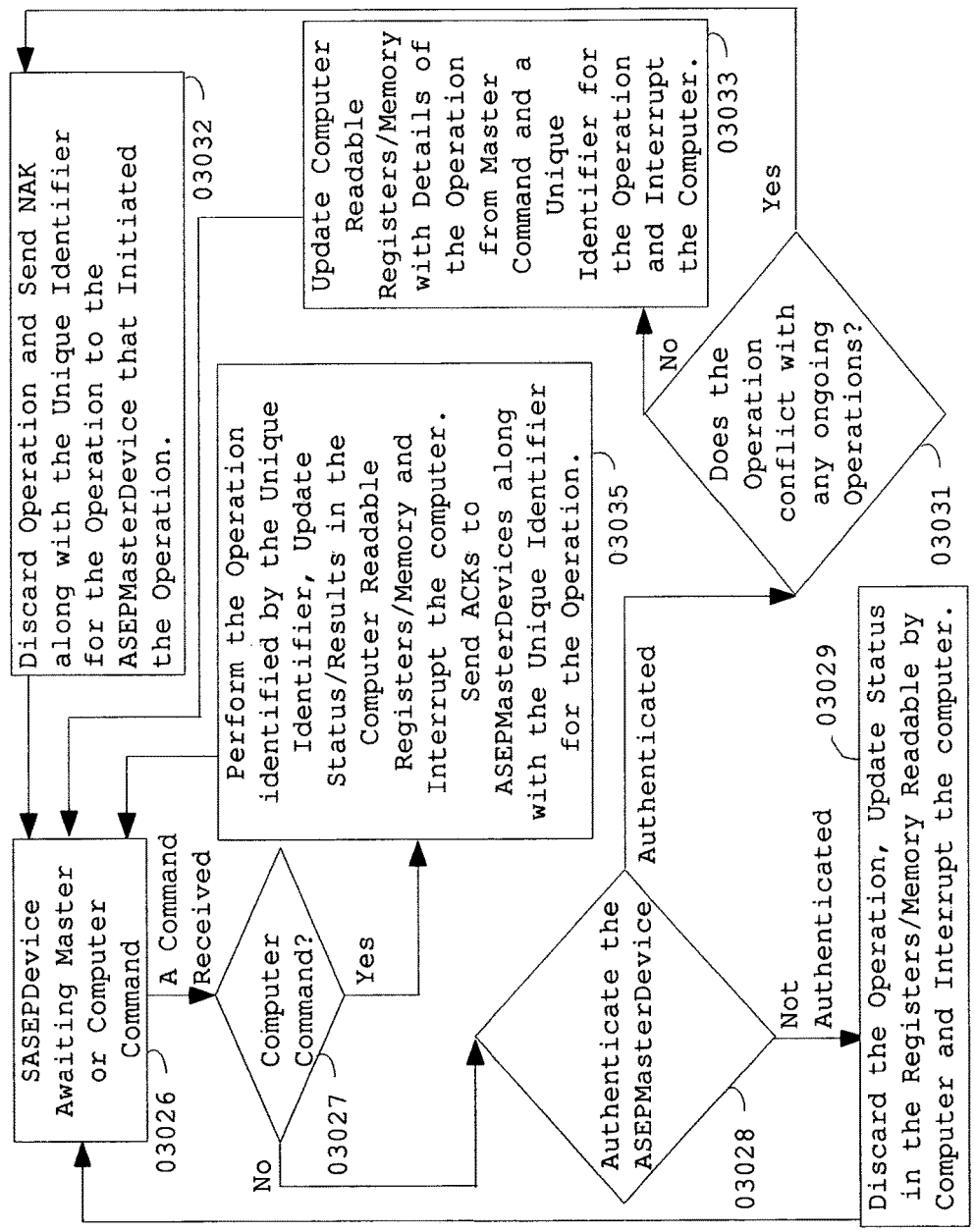
FIG. 3 illustrates an example for states of a SASEPDevice that accepts master commands from an ASEPMasterDevice.

FIG. 3 illustrates an example for different states of a SASEPDevice that is attached to a computer and also accepts Master Commands from one or more ASEPMasterDevices. The SASEPDevice in this example need not synchronize operations with other SASEPDevices. The SASEPDevice in this example is capable of identifying and resolving operation conflicts. The SASEPDevice awaits 03026 either a Master Command from one of the ASEPMasterDevices that control it or a command from the computer to which it is attached. The SASEPDevice checks 03027 the type of command, a Master Command or a computer command. When a Master Command is received, the SASEPDevice authenticates 03028 the ASEPMasterDevice that sent the Master Command. If the authentication fails 03029, the SASEPDevice discards the operation requested by the Master Command, updates registers/memory readable by the computer to which the SASEPDevice is attached with the reason for discarding the operation, interrupts the computer and returns to the state 03026 where it awaits a Master Command or a computer command. If the ASEPMasterDevice authentication is successful, the SASEPDevice checks 03031 whether the operation requested by the Master Command has conflicts with any of the ongoing operations. If the operation has conflicts with any of the ongoing operations 03032, the SASEPDevice discards the operation requested by the Master Command, sends a Negative Acknowledgment (NAK) along with the Unique Identifier for that operation to the ASEPMasterDevice that sent that Master Command and returns to the state 03026 where it awaits a Master Command or a computer command. If the operation requested by the Master Command does not have any conflict with ongoing operations 03033, the SASEPDevice updates computer readable registers/memory with details of the operation and a Unique Identifier for that operation, interrupts the computer to which the SASEPDevice is attached and returns to the state 03026 where it awaits a Master Command or a computer command. When a computer command is received 03035 (a computer command in this case indicates that cleanup required for an operation is completed), the SASEPDevice performs the operation identified by the Unique Identifier, updates computer readable registers/memory with status/results, interrupts the computer to which it is attached, sends an Acknowledgment (ACK) along with details and results from the operation and the Unique Identifier for the operation to each of those ASEPMasterDevices Which are identified for receiving Acknowledgments (ACKs) for that operation when that operation is performed (so that the configuration and Application Security Environment States in all those ASEPMasterDevices are synchronized) and returns to the state 03026 where it awaits a Master Command or a computer command. The list of ASEPMasterDevices to which Acknowledgments (ACKs) are sent by a SASEPDevice for an operation contains all the ASEPMasterDevices which contain configurations or Application Security Environment States that will be affected by that operation. The Acknowledgment (ACK) contains the results of the operation so that the configuration kept in the ASEPMasterDevices can be synchronized with the configuration in the SASEPDevice.

If the configuration containing the Application Security Environment State Mappings is stored in a SASEPDevice and the operation performed by that SASEPDevice is for an Application Security Environment State change, then that SASEPDevice can update registers/memory with the new privileges that the processes/tasks running in the Application Security Environment have, as part of performing that operation.

The SASEPDevice may use registers or memory readable by the computer to communicate the operation requested by an ASEPMasterDevice. Preferably, a computer should not be allowed to write into these registers or memory locations. This improves security as a malicious software will not be able to manipulate an operation requested by an ASEPMasterDevice (which in turn is an operation requested by a user by performing an ASEPManualAction on that ASEPMasterDevice).

When a new user or a new user group or a new Application Security Environment or a new Application Security Environment State is created, the SASEPDevice and/or ASEPMasterDevice can allocate memory and create data structures for storing the corresponding information as part of performing the operation.

When a user or a user group or an Application Security Environment or an Application Security Environment State is deleted, the SASEPDevice and/or ASEPMasterDevice can deallocate the corresponding memory and update the corresponding data structures as part of performing the operation.

When an Application Security Environment State Mapping is changed, the SASEPDevice can update internal data structures corresponding to that mapping and also update registers/memory containing the current set of privileges for the Application Security Environment based on its current state. The updates done by a SASEPDevice as part of performing an operation are implementation specific.

The order in which the validation of an operation requested by a user by performing an ASEPManualAction on an ASEPMasterDevice, the check to verify whether the user who initiated that operation has sufficient privileges to perform that operation and the check to detect whether that operation has conflict with any ongoing operations are done by a SASEPDevice, is implementation specific.

SASEPDevices can use different algorithms for resolving conflicts between operations, such as algorithms using priorities, algorithms which queue operations until all prior conflicting operations are completed, etc.

Algorithms used in SASEPDevices for resolving conflicts can use priorities for operations. For example, when a privileged user has initiated a high priority operation and if one conflicting low priority operation is ongoing, the ongoing operation can be marked as inactive and the high priority operation can be kept pending. The inactive operation is discarded and the pending operation is sent to the SASEPDevice device driver by the SASEPDevice as soon as the SASEPDevice device driver sends a command to the SASEPDevice to discard or complete the inactive operation. When an operation is discarded, the computer to which the SASEPDevice is attached, is notified using an interrupt. If the ASEPSoftware has done any cleanup for a discarded operation, part of the cleanup may have to be rolled back depending on the operation. Preferably, only one high priority operation can be kept pending and all other conflicting high priority operations are discarded. There are different ways to resolve conflicts between operations based on priorities.

The algorithm Used in a SASEPDevice for resolving conflict between new and ongoing operations is implementation specific.

For operations to be done by more than one SASEPDevice without synchronization, it is recommended that different Unique Identifiers should be used for the same operation when it is sent to different SASEPDevices by an ASEPMasterDevice. These operations are treated as different operations by the SASEPDevices and some of the SASEPDevices may perform these operations while the other SASEPDevices may discard these operations. The ASEPMasterDevices can report the status of the operation on each SASEPDevice separately. For some of the operations which are to be done by more than one SASEPDevice without synchronization, as part of performing an ASEPManualAction to initiate an operation, a user should identify the SASEPDevices which should handle that operation requested by that ASEPManualAction. Preferably, for most of the operations an ASEPMasterDevice should be able to identify (based on the configuration) the SASEPDevices to which an operation requested by a user by performing an ASEPManualAction should be communicated. In this case, there is no need for a user to identify the SASEPDevices which should handle the operations requested by the user by performing ASEPManualActions.

Figure 4:
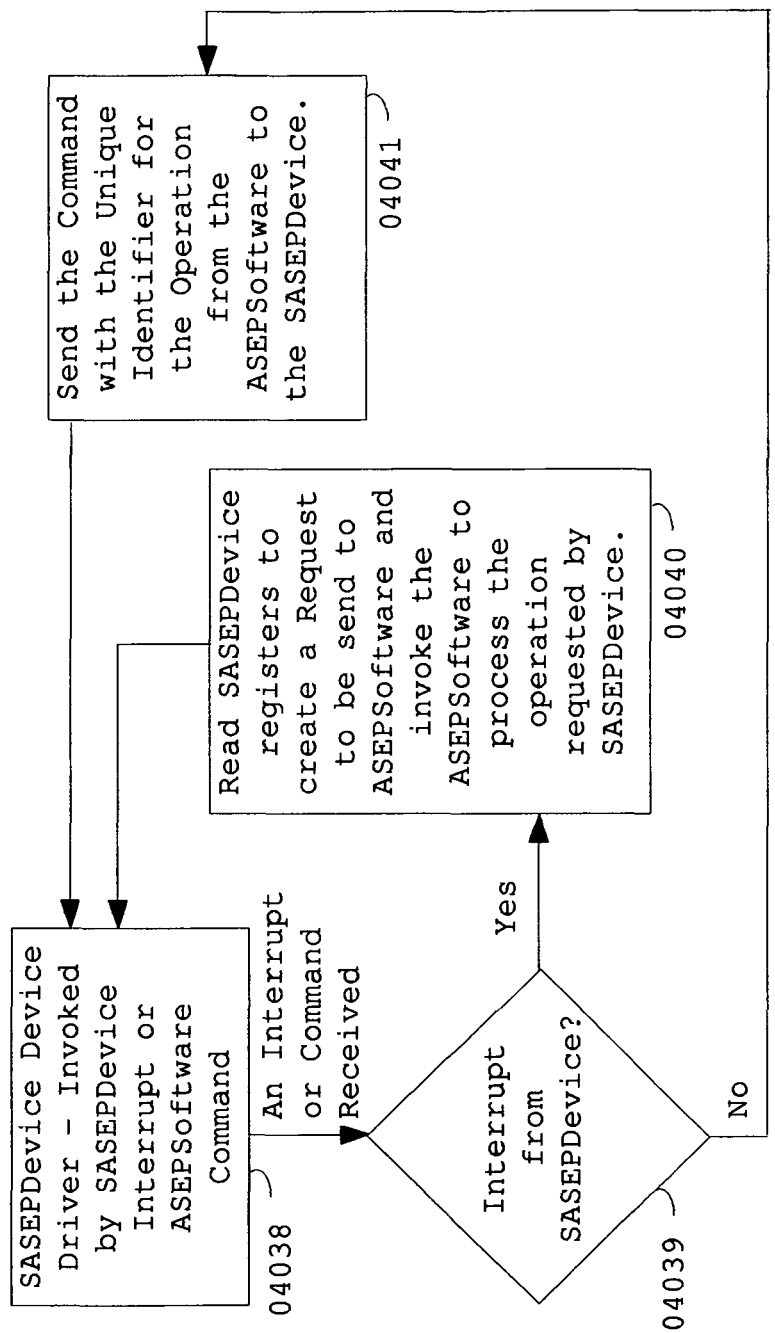
FIG. 4 illustrates an example of a state machine of a SASEPDevice device driver that controls a SASEPDevice.

FIG. 4 illustrates an example of a state machine of a SASEPDevice device driver. The SASEPDevice device driver awaits 04038 an interrupt from a SASEPDevice or a command from the ASEPSoftware. The SASEPDevice device driver checks 04039 whether it got invoked due to an interrupt or due to a command sent by the ASEPSoftware. When an interrupt is received from the SASEPDevice 04040, the device driver reads the SASEPDevice registers and memory to create a request to be passed to the ASEPSoftware. Then it invokes the ASEPSoftware to process the request. When the ASEPSoftware invokes 04041 the SASEPDevice device driver by sending a command, the driver sends that command to the SASEPDevice by writing into the SASEPDevice registers/memory.

A SASEPDevice device driver may control one or more SASEPDevices. There could be one or more SASEPDevice device drivers running on a computer, each controlling a mutually exclusive set of SASEPDevices.

Preferably, most of the ASEPSoftware should be part of the operating system.

Figure 5:
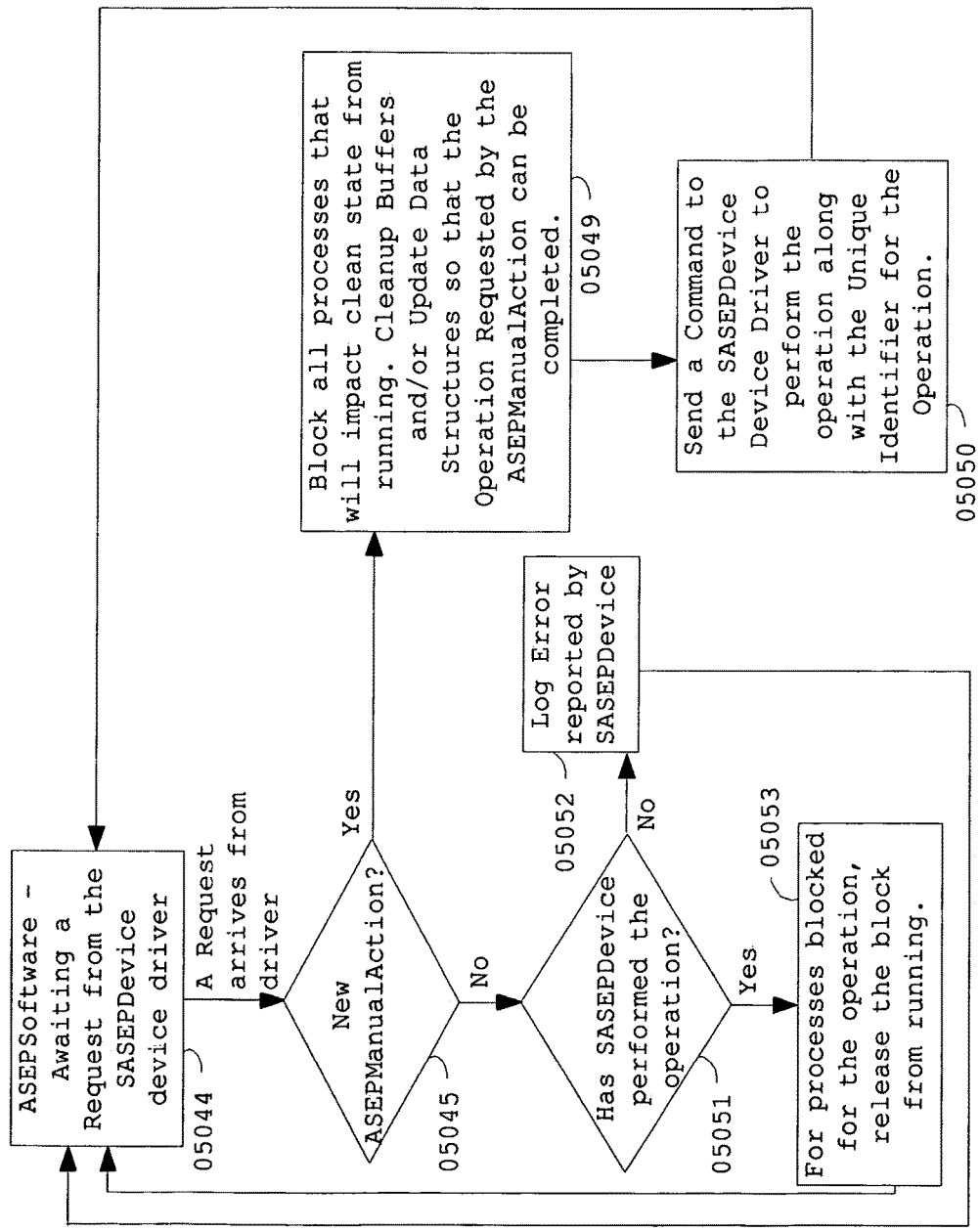
FIG. 5 illustrates an example of a state machine of ASEPSoftware which processes requests from a SASEPDevice device driver.

FIG. 5 illustrates an example of a state machine of the ASEPSoftware that processes requests from a SASEPDevice device driver. The ASEPSoftware 0504A awaits requests from the SASEPDevice device driver. When a request from the SASEPDevice device driver arrives, the ASEPSoftware checks whether the request is for an operation corresponding to a new ASEPManualAction 05045. If the request is for an operation corresponding to a new ASEPManualAction, the ASEPSoftware performs the cleanup 05049 required to perform that operation including cleaning up of buffers and updating data structures as required. Before the cleanup is done, all the processes that will impact the clean state are blocked from running 05049. The ASEPSoftware may interact with other operating system modules to get the required cleanup completed. After the clean up is completed, the ASEPSoftware sends a command 05050 to the SASEPDevice device driver along with the Unique Identifier for the operation so that the SASEPDevice can perform that operation and the ASEPSoftware goes back to the state 05044 where it awaits a new request from the SASEPDevice device driver. In the state 05050, the ASEPSoftware does not release the not-ready-to-run state for processes that will impact the clean state. If the request from the SASEPDevice device driver is not for a new ASEPManualAction 05051, the ASEPSoftware checks whether the SASEPDevice has performed an operation. When an operation is completed 05053, for all the processes that were blocked from running for that operation to complete, the ASEPSoftware releases the block and goes back to the state 05044 where it awaits a new request from the SASEPDevice device driver. If the request from the SASEPDevice device driver is to indicate that an ASEPMasterDevice that sent a Master Command could not be authenticated, the ASEPSoftware logs 05052 the error and goes back to the state 05044 where it awaits a new request from the SASEPDevice device driver.

The ASEPSoftware could consist of different components such as configuration commands, operating system modules that create/delete/update data structures and configuration for users, user groups, Application Security Environments, Application Security Environment States and Application Security Environment State Mappings.

If the operation requested by an ASEPManualAction is to delete a user, preferably, all the processes/tasks owned by that user will be terminated and all data structures for the Application Security Environments owned by that user will be deleted as part of the cleanup. If the operation requested by an ASEPManualAction is to delete an Application Security Environment, preferably, all the processes/tasks in the Application Security Environment will be terminated as part of the clean up. If the operation requested by an ASEPManualAction is to delete a state of an Application Security Environment and if the current state of the Application Security Environment is the same as the state being deleted, it is considered an invalid operation. If the operation requested is a change of Application Security Environment State, all the processes/tasks in that Application Security Environment must be prevented from running and those processes/tasks are allowed to run again only after the state change is completed by the SASEPDevice. A process or a task could be blocked for more than one operation to complete and it will be allowed to run only after all those operations are completed. If the operation requested by an ASEPManualAction is to lower the privileges corresponding to a user or a user group, then the set of privileges corresponding to the Application Security Environment States of the Application Security Environments which are owned by that user or that user group will be also be lowered accordingly, by ANDing with the new set of privileges for the user or the user group.

Optionally, when an operation requested by an ASEPManualAction is to delete a user and if that user has processes/tasks which are active, the operation can be discarded as a conflicting operation.

As part of cleanup for an operation, all the processes/tasks that will affect the clean state required for that operation must be stopped from running.

Examples of operations that require cleanup/update by an ASEPSoftware are the creation/deletion of one or more users or user groups or Application Security Environments or Application Security Environment States or, adding/deleting one or more users to or from a user group or, changing the state corresponding to an Application Security Environment or, changing the privileges of a user or a user group or, modifying the Application Security Environment State Mappings for the current Application Security Environment State.

In order to protect data on mass-memories, the mass-memories are divided into Regions and read or write access to each Region is controlled for each user or each user group. Privileged users limit the read or write access for each user or user group to these Regions as proposed in U.S. patent application Ser. Nos. 11/514,807, 11/515,619 and 11/519,178. Users can further limit access to each Application Security Environment owned by them. These limits are applied in addition to the restrictions applied at file system level.

File systems and raw disk access system calls can tag each read or write operation with the identifier of the Application Security Environment from which the file operation or raw disk access is attempted. Each buffer in a buffer cache in a file system is tagged similarly to the proposal in U.S. patent application Ser. Nos. 11/514,807, 11/515,619 and 11/519,178. Each buffer can have multiple tags and each tag corresponds to an Application Security Environment. When a file operation done by a process/task maps to a buffer in the buffer cache, the file system checks whether the Application Security Environment already has an Application Security Environment tag for that buffer. If the Application Security Environment tag exists, the file system checks whether the operation requested by the file operation is permitted by the tag. If the file operation is not permitted, the file system returns an error to the process/task that requested the operation. If the Application Security Environment tag exists and the tag allows the file operation, the read or write to the buffer is allowed to proceed. If the Application Security Environment tag does not exist, the file system calls an ASEPImplementer with the identifier for the Application Security Environment and an identifier for the Region of the mass-memory. The ASEPImplementer checks the SASEPDevice registers/memory corresponding to the Region of the mass-memory and the Application Security Environment and creates an Application Security Environment tag. The Application Security Environment tag is returned to the file system. The file system adds the tag to the buffer and verifies whether the operation requested is permitted by the tag. If the Application Security Environment tag does not permit the requested operation, an error is returned to the process/task. If the Application Security Environment tag permits the operation, the operation is allowed to continue. If the buffer requested by a file operation does not exist, the file system gets an Application Security Environment tag for the buffer from the ASEPImplementer. If the operation is permitted, the file system creates a new buffer in its buffer cache, adds the Application Security Environment tag to that buffer and if required, creates a mass-memory read request for the buffer along with the tag. A mass-memory read request is required if the buffer is being read or is being partially written by the process/task. If the operation is not permitted by the Application Security Environment tag, an error is returned to the process/task and no new buffer will be created. The Application Security Environment tag is passed to storage components below the file system along with mass-memory read or write requests similar to the proposal in U.S. patent application Ser. Nos. 11/514,807, 11/515,619 and 11/519,178.

Before the state of an Application Security Environment can be changed, as part of cleanup, all the tags for that Application Security Environment should be removed from the buffers in the buffer cache in a file system. Similar cleanup will be required in all file systems in the operating system.

Similar cleanup is required when an Application Security Environment or an ASEO is deleted or when the privileges of an ASEO is changed or when the set of privileges corresponding to the current state of an Application Security Environment is modified.

There are different options for restarting processes/tasks which are blocked for cleanup. One option is to configure the SASEPDevice to generate an interrupt when an operation completes as shown in the examples. The processes/tasks are blocked from executing until the interrupt is processed by the SASEPDevice device driver. Another option is to use a timeout for an operation to complete and processes/tasks in the Application Security Environment are blocked from execution during the timeout period. If the operation does not complete during the timeout period, the user who initiated the ASEPManualAction can either abort the operation or initiate another timeout. This is not a recommended option. A third option is to use both the timeout and the interrupt for maintaining the clean state until the operation is completed.

If the configuration is not kept in the ASEPMasterDevices and SASEPDevices, validity of an operation will have to be verified by the ASEPSoftware. In this case, if an operation is invalid as per the configuration, the ASEPSoftware will send a command to the SASEPDevice to discard that operation.

ASEPImplementers are computer software modules that implement access protection using SASEPDevice/s and create Application Security Environment tags for file systems. Preferably, all or most of the ASEPImplementers should be part of the operating system.

Figure 6:
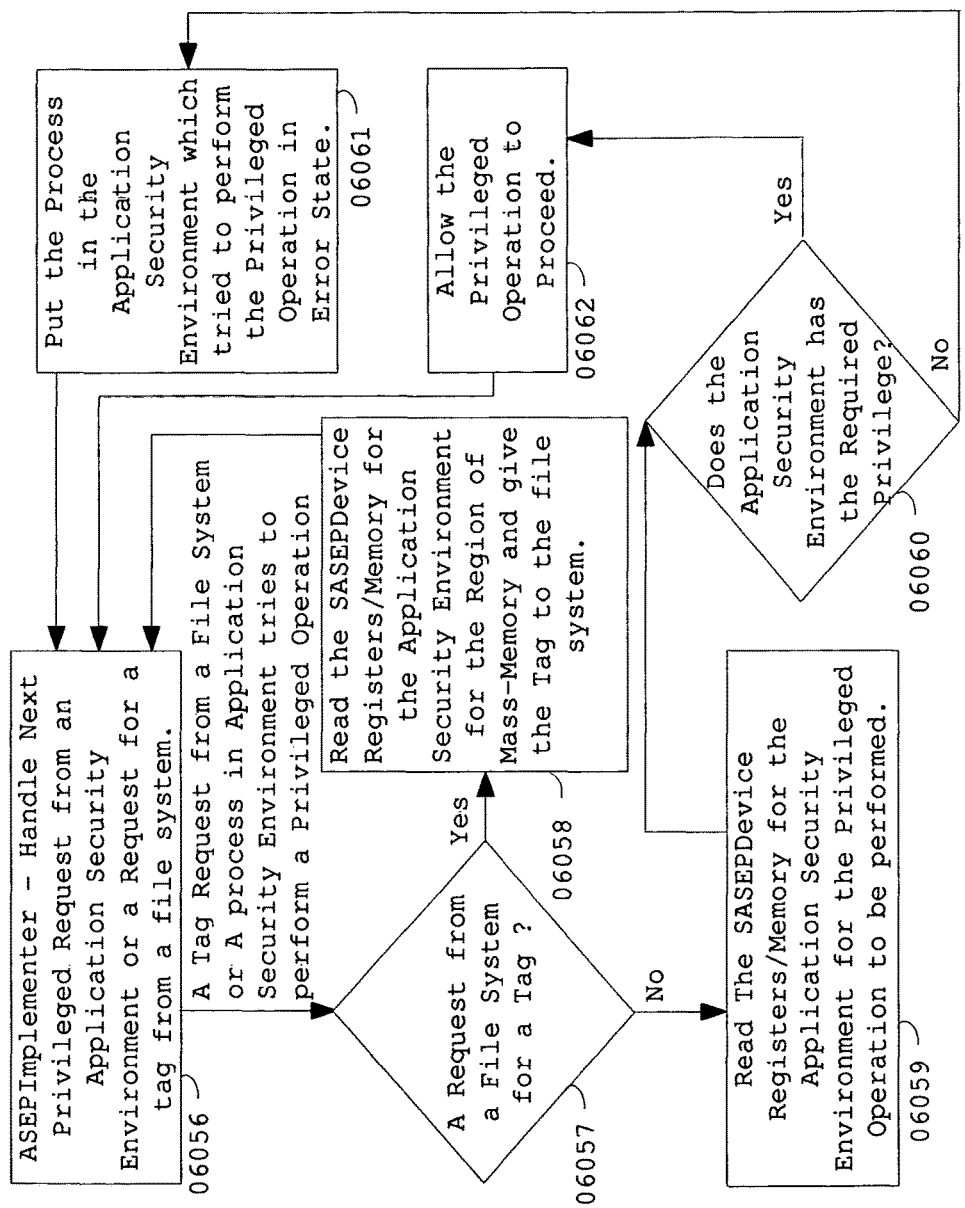
FIG. 6 illustrates an example of a state machine of an ASEPImplementer that implements access restrictions for Application Security Environments using a SASEPDevice.

FIG. 6 illustrates an example of a state machine of an ASEPImplementer. The ASEPImplementer gets invoked 06056 when a process or a task or a thread attempts to do a privileged operation or when a file system requests an Application Security Environment tag. The ASEPImplementer checks 06057 whether it was invoked by a request from a file system for a tag. If it is a request from a file system 06058, the ASEPImplementer reads read-only SASEPDevice registers/Memory corresponding to the Application Security Environment and the Region of mass-memory to create the tag. The tag is sent 06058 to the file system and the ASEPImplementer returns. If the request is not a tag request from a file system, the ASEPImplementer checks 06060 whether the process/task/thread that is attempting to do a privileged operation has the privilege to perform the privileged operation by reading 06059 read-only registers/memory corresponding to the requested privileged operation for the Application Security Environment in which the process or task or thread is executing. If the Application Security Environment has the privilege 06062 to perform the privileged operation in its current state, the process/task/thread is allowed to perform the privileged operation and the ASEPImplementer returns. If the Application Security Environment does not have the privilege 06061 to perform the operation in its current state, the process/task/thread that attempted to do the privileged operation is placed in an error state and the ASEPImplementer returns. Handling of the process/task/thread in the error state is done by the operating system.

If there is no configuration present for a privileged operation which is attempted by a process/task/thread in an Application Security Environment such as when there is no Application Security Environment State Mapping for the current Application Security Environment State or when there are no states defined for an Application Security Environment, then preferably, ASEPImplementers must be configured to block the privileged operation. There could be some ASEPImplementers that are configured to allow the privileged operation when there is no configuration.

The ASEPImplementer may be designed such that it places an application in an error state when a process or a task or a thread in the application requests a privileged operation which is not allowed by the current state of the Application Security Environment. The way an ASEPImplementer handles a privileged operation failure is implementation specific.

Figure 7:
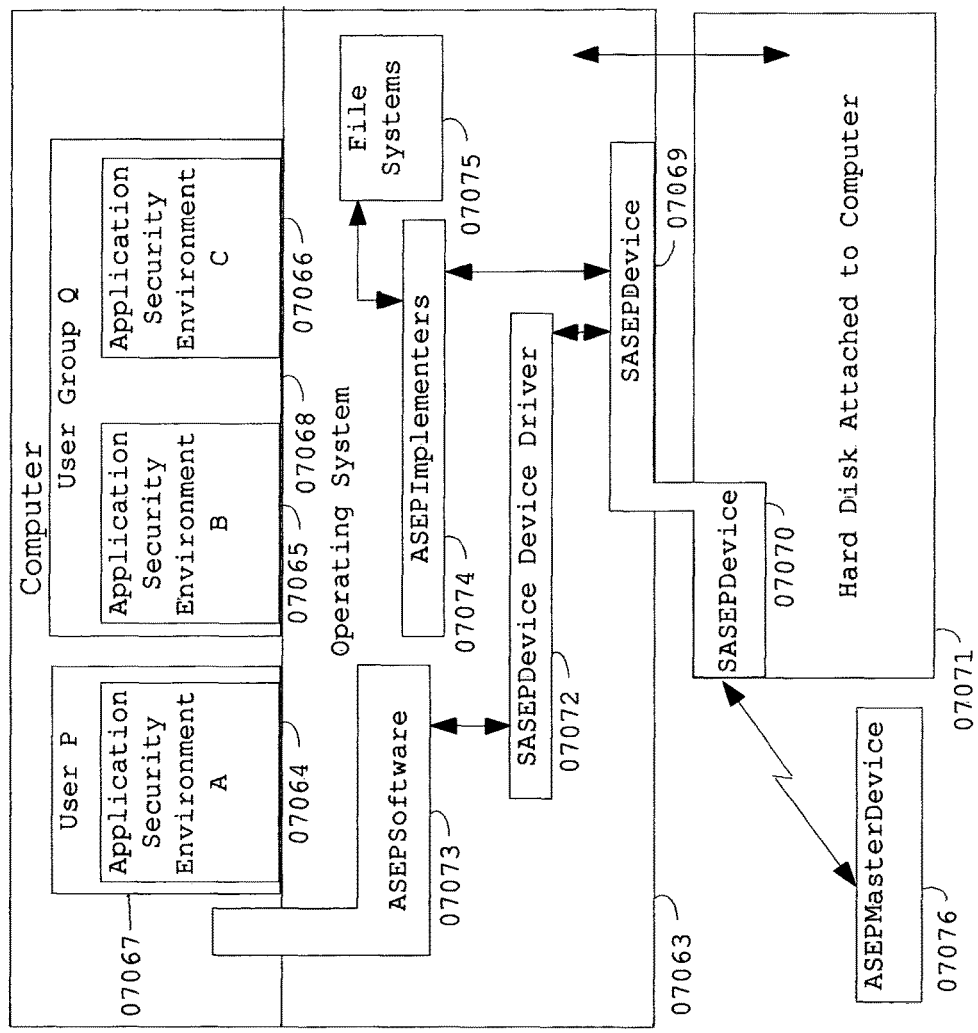
FIG. 7 illustrates an example of how different components in a computer interact when used with an ASEPMasterDevice and a SASEPDevice.

FIG. 7 illustrates an example of a computer 07063 that implements access protection using a SASEPDevice. The computer has an Application Security Environment A 07064 which is owned by User P 07067 and Application Security Environments B 07065 and C 07066 which are owned by User Group Q 07068. A SASEPDevice 07069 is controlled by an ASEPMasterDevice 07076 and is attached to the computer 07063. Part 07070 of the SASEPDevice 07069 is embedded in a hard disk 07071 attached to the computer so that disk firmware can read SASEPDevice registers and memory without interacting with the computer or a link external to the disk. The SASEPDevice 07069 is also controlled by a SASEPDevice device driver 07072. The SASEPDevice device driver 07072 passes requests from the SASEPDevice 07069 to the ASEPSoftware 07073 and commands from the ASEPSoftware 07073 to the SASEPDevice 07069. Most of the ASEPSoftware is part of the operating system. A part of the software which writes errors to log files is part of the user space. ASEPImplementers 07074 enforce access control by reading the SASEPDevice 07069 registers/memory. File systems 07075 interact with the ASEPImplementers 07074 to get Application Security Environment tags.

ASEPImplementers can use the SASEPDevice device driver interfaces for reading SASEPDevice registers/memory.

There are different ways to distribute functionality between ASEPMasterDevices, SASEPDevices and ASEPSoftware. Optionally, ASEPSoftware can be used to verify whether an operation requested through an ASEPManualAction is valid. In this case, when an operation is not valid, the ASEPSoftware can send a command to the SASEPDevice to discard that operation and the SASEPDevice can send a Negative Acknowledgment (NAK) to the ASEPMasterDevice when it receives that command from the ASEPSoftware to discard that operation. Similarly, an ASEPSoftware can be used to verify whether there is a conflict between a new operation requested by an ASEPManualAction and the ongoing operations. In this case, when an operation having a conflict is selected for discarding by the operation conflict resolution algorithm, the ASEPSoftware can send a command to the SASEPDevice to discard that operation and the SASEPDevice can send a Negative Acknowledgment (NAK) to the ASEPMasterDevice when it receives that command from the ASEPSoftware to discard that operation. Similarly, an ASEPMasterDevice can be used to verify whether there is a conflict between a new operation requested by an ASEPManualAction and the ongoing operations. Similarly, a SASEPDevice or the ASEPSoftware can be used for determining whether a user has enough privileges to perform an operation requested by that user by performing an ASEPManualAction. The ASEPSoftware can be used for logging all the errors from both ASEPMasterDevices and SASEPDevices. This will require an ASEPMasterDevice to send a message to a SASEPDevice Whenever an error occurs and the SASEPDevice device driver to read those errors from that SASEPDevice and send those errors to the ASEPSoftware which can log those errors. The distribution of the functionality between ASEPSoftware and SASEPDevices and ASEPMasterDevices is implementation specific.

Figure 8:
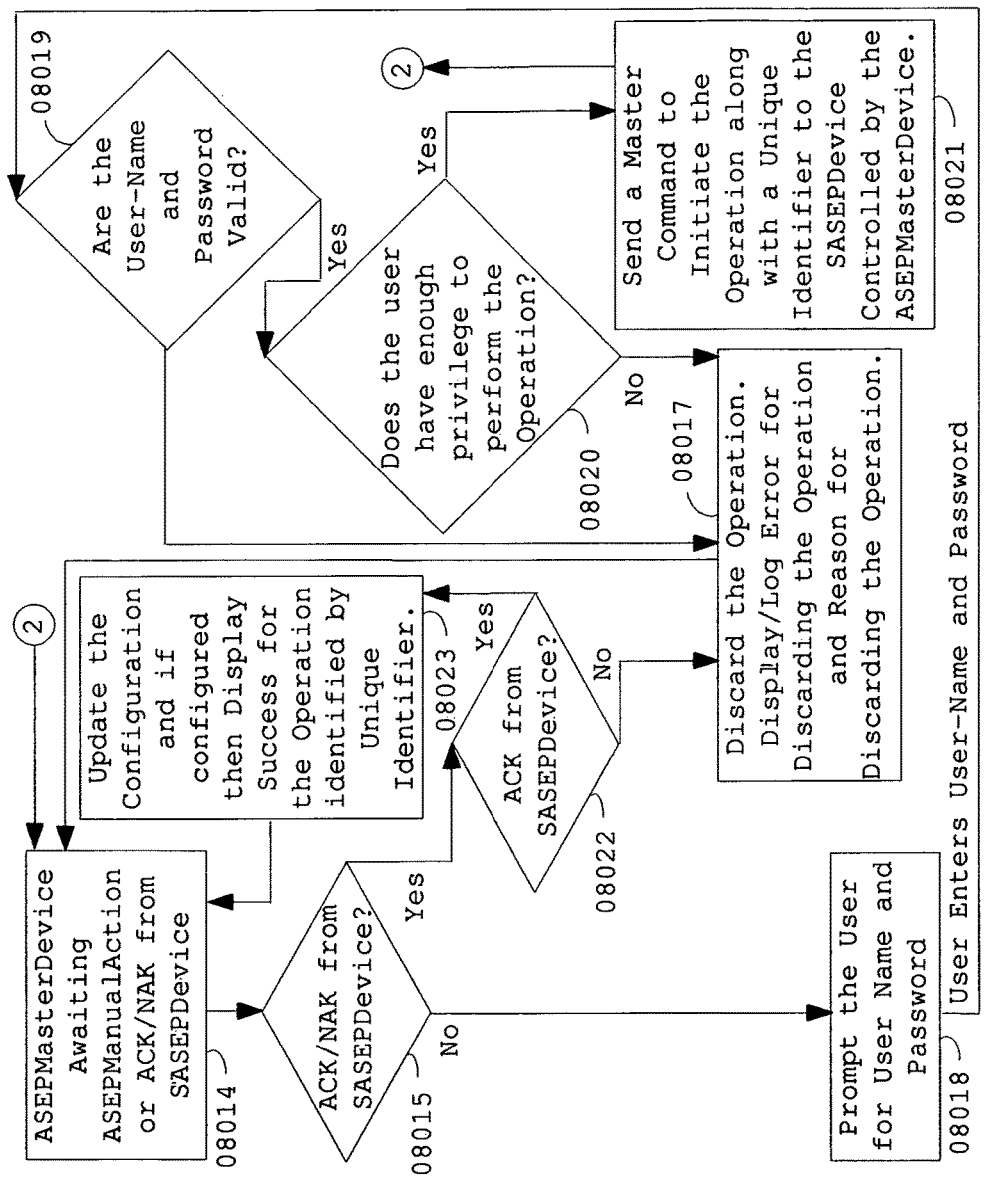
FIG. 8 illustrates an example of a state machine of an ASEPMasterDevice which does not check validity of operations requested by users by performing ASEPManualActions.

FIG. 8 illustrates an example of a state machine of an ASEPMasterDevice that accepts ASEPManualAction. Only a part of the configuration is stored in this ASEPMasterDevice and hence the ASEPMasterDevice cannot determine whether an operation requested by a user by performing an ASEPManualAction is valid or not. But the firmware running on the ASEPMasterDevice can determine whether a user has the privilege to perform an operation requested by that user by performing an ASEPManualAction. The ASEPMasterDevice awaits 08014 an ASEPManualAction from a user or an Acknowledgment (ACK) or Negative Acknowledgment (NAK) from the SASEPDevice controlled by the ASEPMasterDevice. The ASEPMasterDevice checks the type of input 08015, whether an ASEPManualAction or an ACK/NAK from a SASEPDevice is received. When a user performs an ASEPManualAction 08018, the ASEPMasterDevice prompts 08018 the user who performed the ASEPManualAction for the user name and password. When the user enters the user name and password, the user name and password are validated 08019. If the validation fails 08017, the ASEPMasterDevice discards the operation, displays an error message for discarding the operation along with the reason for discarding the operation (invalid user-name/password), logs the error and goes back to the state 08014 where the ASEPMasterDevice awaits an ASEPManualAction from a user or an Acknowledgment (ACK) or Negative Acknowledgment (NAK) from the SASEPDevice. If the user name and password are valid, the ASEPSoftware checks whether the user has the privilege 08020 to perform the operation requested by the user by performing the ASEPManualAction. If the user does not have the required privilege 08017, the ASEPMasterDevice discards the operation, displays an error message for discarding the operation along with the reason for discarding the operation (insufficient privilege), logs the error and goes back to the state 08014 where the ASEPMasterDevice awaits an ASEPManualAction from a user or an Acknowledgment (ACK) or Negative Acknowledgment (NAK) from the SASEPDevice. If the user has the required privilege to perform the operation 08021, the ASEPMasterDevice sends a Master Command to the SASEPDevice controlled by it. The Master Command contains the details of the operation requested by the user by performing the ASEPManualAction and a Unique Identifier for that operation. Then the ASEPMasterDevice goes back to the state 08014 where the ASEPMasterDevice awaits an ASEPManualAction from a user or an Acknowledgment (ACK) or Negative Acknowledgment (NAK) from the SASEPDevice. When an Acknowledgment (ACK) or Negative Acknowledgment (NAK) from the SASEPDevice is received, the ASEPMasterDevice checks 08022 whether it is an Acknowledgment (ACK) from the SASEPDevice. If it is not an Acknowledgment (ACK) 08017, the ASEPMasterDevice discards the operation, displays an error message for discarding the operation along with the reason for discarding the operation (Negative Acknowledgment (NAK) from SASEPDevice), logs the error and goes back to the state 08014 where the ASEPMasterDevice awaits an ASEPManualAction from a user or an Acknowledgment (ACK) or Negative Acknowledgment (NAK) from the SASEPDevice. When an Acknowledgment (ACK) from the SASEPDevice is received 08023 indicating that the SASEPDevice performed the operation, the ASEPMasterDevice updates the configuration with information contained in the Acknowledgment (ACK), displays a message if the ASEPMasterDevice is configured to display success for that operation and goes back to the state 08014 where the ASEPMasterDevice awaits an ASEPManualAction from a user or an Acknowledgment (ACK) or Negative Acknowledgment (NAK) from the SASEPDevice. An Acknowledgment (ACK) for a successfully completed operation is sent to one or more ASEPMasterDevices so that configurations in all those ASEPMasterDevices are synchronized. So an ASEPMasterDevice need not display a message whenever an Acknowledgment is received. Whether a message will be displayed by an ASEPMasterDevice for an operation requested by a user using another ASEPMasterDevice will depend on the privileges of the user of that ASEPMasterDevice and the configuration. The success message is displayed if the successful operation was initiated on that ASEPMasterDevice so that the user knows that the operation that user initiated has been successfully completed.

Figure 9:
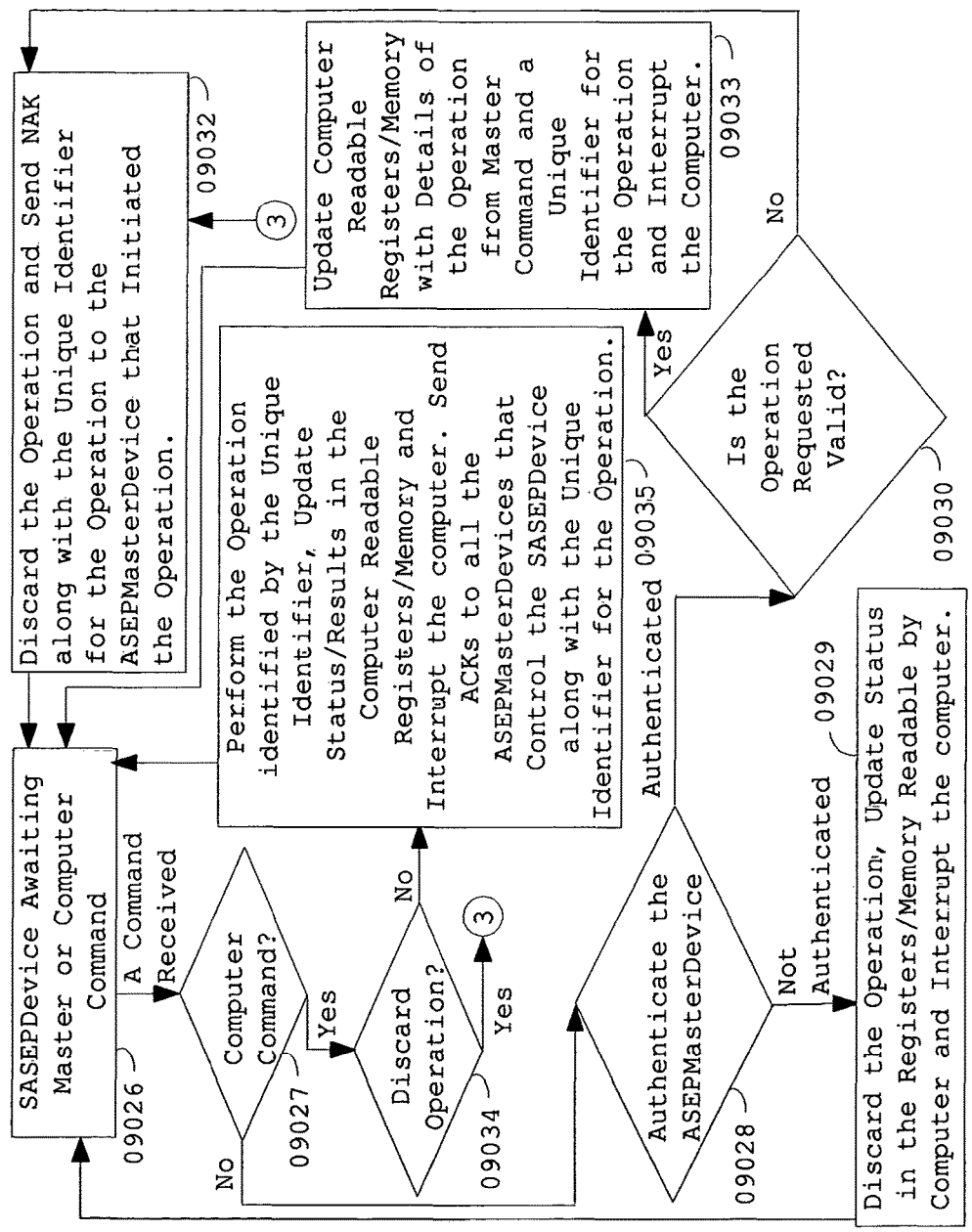
FIG. 9 illustrates an example of a state machine of a SASEPDevice that checks validity of operations each of which is requested by a user by performing an ASEPManualAction on an ASEPMasterDevice, but does not handle conflicts between operations.

FIG. 9 illustrates an example for different states of a SASEPDevice that is attached to a computer and which can be controlled by an ASEPMasterDevice which cannot identify whether an operation is valid or not. The SASEPDevice in this example need not synchronize operations with other SASEPDevices. The SASEPDevice in this example is capable of identifying whether an operation requested by a Master Command (an operation initiated by a user by performing an ASEPManualAction) is valid. The SASEPDevice awaits 09026 either a Master Command from one of the ASEPMasterDevices that control it or a command from the computer to which it is attached. The SASEPDevice checks 09027 the type of command, a Master Command or a computer command. When a Master Command is received, the SASEPDevice authenticates 09028 the ASEPMasterDevice that sent the Master Command. If the authentication fails 09029, the SASEPDevice discards the operation requested by the Master Command, updates registers/memory readable by the computer to which the SASEPDevice is attached with the reason for discarding the operation, interrupts the computer and returns to the state 09026 where it awaits a Master Command or a computer command. If the ASEPMasterDevice authentication is successful, the SASEPDevice checks 09030 whether the operation requested by the Master Command is valid. If the operation is not valid 09032, the SASEPDevice discards the operation requested by the Master Command, sends a Negative Acknowledgment (NAK) along with the Unique Identifier for that operation to the ASEPMasterDevice that sent that Master Command and returns to the state 09026 where it awaits a Master Command or a computer command. If the operation requested by the Master Command is valid 09033, the SASEPDevice updates computer readable registers/memory with details of the operation and a Unique Identifier for that operation, interrupts the computer to which the SASEPDevice is attached and returns to the state 09026 where it awaits a Master Command or a computer command. When a computer command is received 09034, the SASEPDevice checks whether the computer command is to discard an operation. If the command is to discard an operation 09032, the SASEPDevice discards the operation corresponding to the Unique Identifier, sends a Negative Acknowledgment (NAK) along with the Unique Identifier to the ASEPMasterDevice that requested that operation and returns to the state 09026 where it awaits a Master Command or a computer command. If the computer command is to not discard an operation 09035 (in this case, the computer command indicates that cleanup required for an operation is completed), the SASEPDevice performs the operation identified by the Unique Identifier, updates computer readable registers/memory with status/results, interrupts the computer to which that SASEPDevice is attached, sends Acknowledgments (ACKs) to all the ASEPMasterDevices that control the SASEPDevice along with the Unique Identifier for the operation and returns to the state 09026 where it awaits a Master Command or a computer command. The Acknowledgment (ACK) contains results of the operation so that the configuration kept in the ASEPMasterDevices can be synchronized with the configuration in the SASEPDevice.

Figure 10:
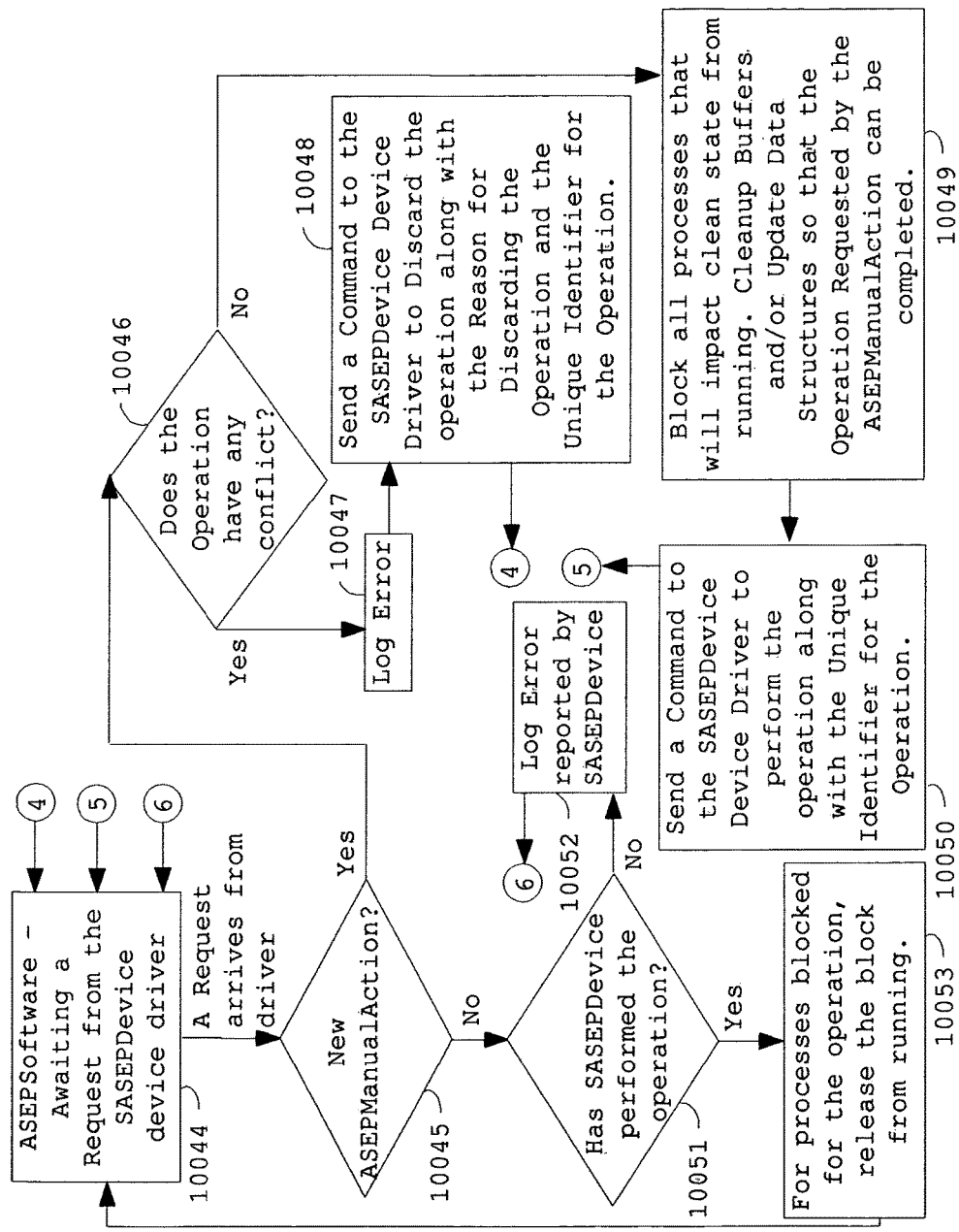
FIG. 10 illustrates an example of a state machine of an ASEPSoftware that can be used with an ASEPMasterDevice and a SASEPDevice which do not handle conflicts between operations.

FIG. 10 illustrates an example of a state machine of the ASEPSoftware that can be used with the SASEPDevice from the example in FIG. 9. The ASEPSoftware 10044 awaits requests from the SASEPDevice device driver. When a request from the SASEPDevice device driver arrives, the ASEPSoftware checks whether the request is for an operation corresponding to a new ASEPManualAction 10045. If the request is for an operation corresponding to a new ASEPManualAction, the ASEPSoftware checks whether the requested operation has any conflict 10046 with any of the ongoing operations. If there is a conflict, the ASEPSoftware logs an error message 10047 and sends a command 10048 along with the Unique Identifier for the operation to the SASEPDevice device driver to discard that operation and goes back to the state 10044 where it awaits a new request from the SASEPDevice device driver. If the operation requested does not have any conflict with ongoing operations the ASEPSoftware performs the cleanup 10049 required to perform that operation including cleaning up of buffers and updating data structures as required. Before the cleanup is done, all the processes that will impact the clean state are blocked from running 10049. The ASEPSoftware may interact with other operating system modules to get the required cleanup completed. After the clean up is completed, the ASEPSoftware sends a command 10050 to the SASEPDevice device driver along with the Unique Identifier for the operation so that the SASEPDevice can perform the operation and goes back to the state 10044 where it awaits a new request from the SASEPDevice device driver. In this state 10050, the ASEPSoftware does not release the not-ready-to-run state for processes that will impact the clean state. If the request from the SASEPDevice device driver is not for a new ASEPManualAction 10051, the ASEPSoftware checks whether the SASEPDevice has performed an operation. When an operation is completed 10053, for all the processes that were blocked from running for that operation to complete, the ASEPSoftware releases the block and goes back to the state 10044 where it awaits a new request from the SASEPDevice device driver. If the request from the SASEPDevice device driver is to indicate that an ASEPMasterDevice that sent a Master Command could not be authenticated, the ASEPSoftware logs 10052 the error and goes back to the state 10044 where it awaits a new request from the SASEPDevice device driver.

The ASEPSoftware may use different algorithms to resolve conflict between a new operation and ongoing operations such as queuing all new operations that have a conflict with an ongoing operation, using different levels of priority, etc. If operations have priorities and if a conflicting low priority operation is in a state where it can be stopped, a new high priority operation can result in the ongoing low priority operation to be marked to be stopped and the high priority operation can be kept pending until the ongoing operation is stopped. The algorithm used for resolving conflict between ongoing operations and a new operation is implementation specific.

There could be one or more SASEPDevices in a computer, each controlling states corresponding to a mutually exclusive set of Application Security Environments or controlling Application Security Environments owned by a mutually exclusive set of users/user-groups or controlling a mutually exclusive set of privileges. Some implementations may use more than one SASEPDevice on the same computer, each controlling states corresponding to sets of Application Security Environments which are not mutually exclusive, but we do not recommend such implementations.

Parts of a SASEPDevice could be embedded in different peripheral or mass-memory devices attached to a computer, such as hard disks. In this case, a mass-memory device controller can implement privileges based on the current state of the Application Security Environments. This will significantly improve security for mass-memories attached to computers as a malicious user will not be able to copy data from these mass memory devices even if they are stolen.

When an ASEPMasterDevice controls more than one SASEPDevice each connected to a different computer, it may be required to synchronize Application Security Environment State changes and configuration changes between those SASEPDevices. Some SASEPDevices can be configured to synchronize some configuration changes and state changes for some Application Security Environments. Those SASEPDevices synchronize each operation that needs synchronization between those SASEPDevices using a device. The device that is used for synchronizing an operation between SASEPDevices is referred to as Application Security Environment Protection Synchronizer or ASEPSynchronizer; Preferably, the ASEPSynchronizer for an operation is the same device as the ASEPMasterDevice on which that operation was initiated by a user by performing an ASEPManualAction.

Optionally, the ASEPSynchronizer for an operation can be an ASEPMasterDevice different from the ASEPMasterDevice that initiated an operation. Optionally, the ASEPSynchronizer for an operation can be a device different from an ASEPMasterDevice. When the ASEPSynchronizer for an operation is different from the ASEPMasterDevice on which that operation was initiated, then:
  i. Preferably, there has to be a communication channel between that ASEPSynchronizer and that ASEPMasterDevice so that the user who initiated an operation can be informed when that operation is performed or discarded;
  ii. The communication options for communication between SASEPDevices and ASEPSynchronizers are similar to the communication options for communication between SASEPDevices and ASEPMasterDevices.

When a device different from the ASEPMasterDevice that initiated an operation is used by SASEPDevices for synchronizing that operation, that device must be able identify the list of SASEPDevices that must synchronize for that operation. This information may be configured in that device or can be passed to that device along with details of the operation being synchronized. Optionally, this device used for synchronization can also be used for synchronizing configurations between ASEPMasterDevices.

We do not recommend using an ASEPSynchronizer for an operation different from the ASEPMasterDevice on which that operation was initiated. For the rest of the description of the invention, it is assumed that the ASEPMasterDevice on which an operation is initiated by a user is the same as the ASEPSynchronizer for that operation.

All configuration changes and Application Security Environment State changes need not be synchronized. Based on the configuration, a SASEPDevice can perform some of the configuration changes and Application Security Environment State changes without synchronization between SASEPDevices and some configuration changes and Application Security Environment State changes can be done only after synchronization between SASEPDevices. When a part of the configuration is present only in one SASEPDevice, no synchronization is required for an operation that changes only that part of the configuration. Similarly, when the state of an Application Security Environment is stored only in one SASEPDevice, no synchronization is required changing the state of that Application Security Environment. As part of creating users, user groups and Application Security Environments, users can specify the list of SASEPDevices where the corresponding configurations must be stored and the ASEPMasterDevices and SASEPDevices can identify whether any synchronization is required for an operation based on where the configuration is stored. For example, if an Application Security Environment is present only in one SASEPDevice, no synchronization is required for changing the state of that Application Security Environment. A user can specify whether synchronization can be avoided for Application Security Environment State changes even when the corresponding Application Security Environment owned by that user is present in different SASEPDevices. Some applications can be such that its tasks running on different computers can have different privileges, especially when there is no sharing of mass-memories. We do not recommend avoiding synchronization for Application Security Environment State changes when state of an Application Security Environment is kept in different SASEPDevices. When part of the configuration is present in different SASEPDevices, we strongly recommend that all changes to this part of the configuration must be synchronized.

The message sent by a SASEPDevice to an ASEPMasterDevice used for synchronizing an operation after the cleanup for that operation is completed and if that operation is not identified for discarding is referred to as the SASEPDevice Synchronization Request.

The ASEPMasterDevices that allow SASEPDevices to synchronize must keep track of the list of SASEPDevices that must synchronize for each operation. Preferably, these lists must be stored in the ASEPMasterDevices, so that the ASEPMasterDevices can identify the list of SASEPDevices that must synchronize for an operation as soon as a user requests that operation by performing an ASEPManualAction. Similarly, the ASEPMasterDevices that allow SASEPDevices to synchronize for operations must keep track of the lists of SASEPDevices that must perform or discard each operation that needs synchronization between SASEPDevices. Preferably, these lists must be stored in ASEPMasterDevices so that the ASEPMasterDevices can identify the SASEPDevices to each of which a command (or a message) must be sent as soon as the synchronization between SASEPDevices for an operation is completed successfully. Similarly, the ASEPMasterDevices must be able to identify the SASEPDevices to each of which a command (or a message) must be sent as soon as the synchronization between SASEPDevices for an operation is completed and that operation is to be discarded. We refer to the commands (or messages) which are sent by an ASEPMasterDevice to SASEPDevices after the synchronization between SASEPDevices for operations are complete as Master Confirmations. A Master Confirmation can be for discarding or performing an operation. The list of SASEPDevices to which Master Confirmations for performing an operation must be sent can be different from the list of SASEPDevices to which Master Confirmations for discarding that operation must be sent. Normally, the set of SASEPDevices that must discard an operation will be the same as the set of SASEPDevices that participated in the synchronization for that operation. Normally, the set of SASEPDevices that must perform an operation will be the same or a superset of the set of SASEPDevices that participated in the synchronization for that operation. This is because some SASEPDevices that are attached to peripheral devices need not do any cleanup for operations and hence can be omitted from the list of SASEPDevices that must synchronize for an operation even though the operation impacts the configuration or Application Security Environment States in those SASEPDevices attached to the peripheral devices. Similarly, if more than one SASEPDevice is attached to a computer, only one of those SASEPDevices must participate in the synchronization for an operation.

Figure 11:
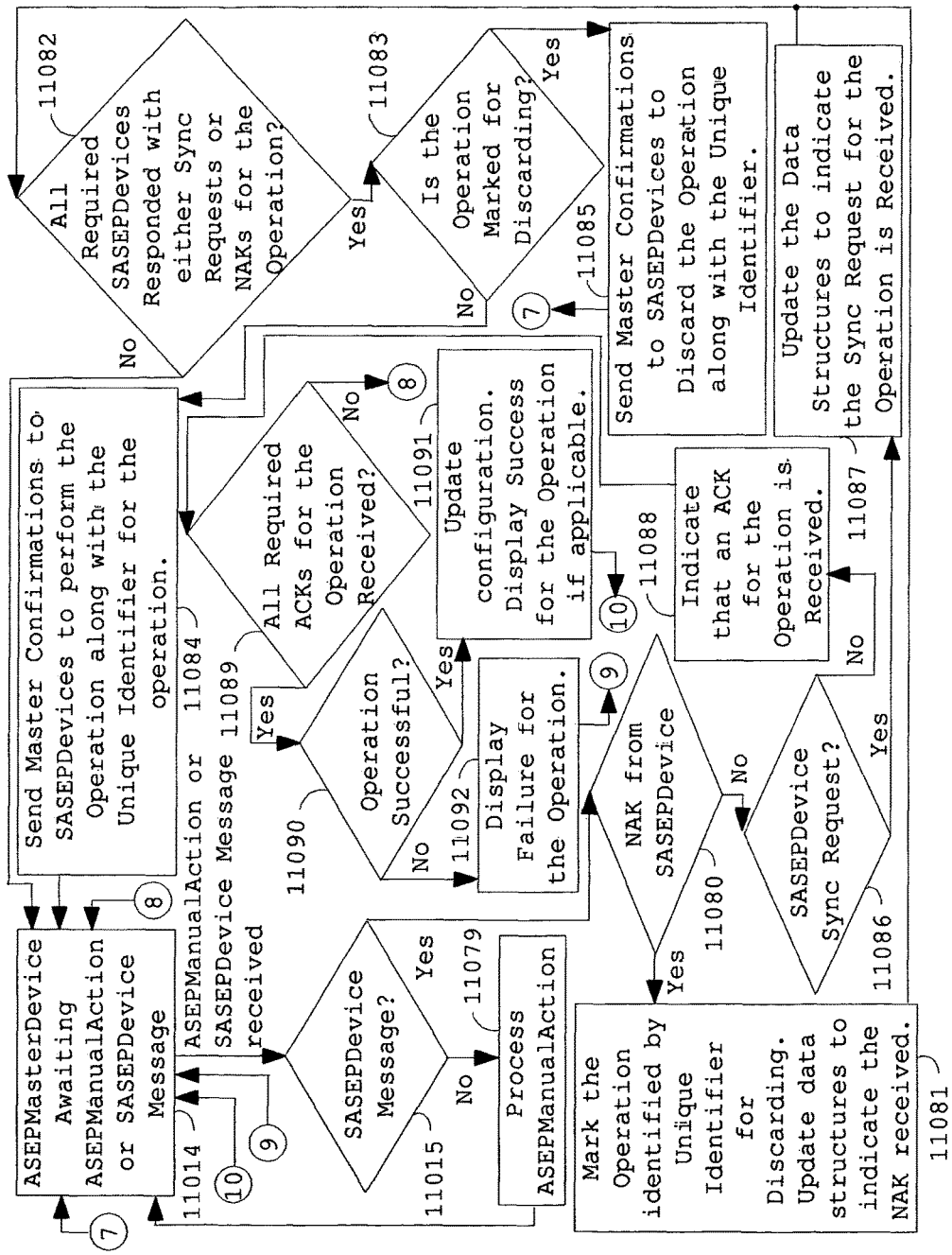
FIG. 11 illustrates an example of a state machine used by an ASEPMasterDevice for operations that require synchronization between SASEPDevices. Synchronization of operations by SASEPDevices allows the configuration in different SASEPDevices and Application Security Environment State changes to be synchronized where applicable.

FIG. 11 illustrates an example of a state machine used by an ASEPMasterDevice for operations that require synchronization between SASEPDevices. The ASEPMasterDevice in this case also behaves as the ASEPSynchronizer. Synchronization of operations between SASEPDevices allows the configuration in different SASEPDevices and Application Security Environment State changes to be synchronized where applicable. Like the ASEPMasterDevice in FIG. 2, the configuration is also stored in this ASEPMasterDevice and hence the firmware running on the ASEPMasterDevice can determine whether an operation requested by a user by performing an ASEPManualAction is valid or not and whether a user has the privileges to perform an operation requested by that user. The ASEPMasterDevice awaits 11014 an ASEPManualAction from a user or a Message from the SASEPDevices controlled by the ASEPMasterDevice. A Message from a SASEPDevice can be an Acknowledgment (ACK) or a Negative Acknowledgment (NAK) or a SASEPDevice Synchronization Request. The ASEPMasterDevice checks the type of input 11015, whether an ASEPManualAction or a Message (ACK/NAK/SASEPDevice Synchronization Request) from a SASEPDevice is received. When a user performs an ASEPManualAction 11079, it is handled in a similar way as illustrated in FIG. 2. However, the Master Commands for initiating an operation requested by a user by performing an ASEPManualAction must be sent to all the SASEPDevices which must participate in the synchronization for that operation. When a Message from a SASEPDevice is received, the ASEPMasterDevice checks 11080 whether it is a Negative Acknowledgment (NAK) from the SASEPDevice. If it is a Negative Acknowledgment (NAK) 11081 for an operation (along with the Unique Identifier for that operation), the ASEPMasterDevice marks that operation for discarding and updates its data structures to indicate that a Negative Acknowledgment (NAK) from that SASEPDevice for that operation is received. Then the SASEPDevice checks 11082 whether all the SASEPDevices which are participating in the synchronization for that operation have responded either with Negative Acknowledgment (NAK) or SASEPDevice Synchronization Request for that operation. If all those SASEPDevices have not responded, the ASEPMasterDevice will go back to the state 11014 where it awaits an ASEPManualAction from a user or a Message from a SASEPDevice. If all those SASEPDevices have responded for that operation 11083, then the ASEPMasterDevice checks 11083 whether that operation is marked for discarding. If that operation is not marked for discarding 11084, the ASEPMasterDevice will send a Master Confirmation to each of those SASEPDevices which are identified for receiving the Master Confirmation for performing that operation to perform that operation and goes back to the state 11014 where it awaits an ASEPManualAction from a user or a Message from a SASEPDevice. If that operation is marked for discarding 11085, the ASEPMasterDevice sends a Master Confirmation to each of those SASEPDevices which are identified for receiving the Master Confirmation for discarding that operation to discard that operation and goes back to the state 11014 where it awaits an ASEPManualAction from a user or a Message from a SASEPDevice. If the Message from the SASEPDevice is not a Negative Acknowledgment (NAK) 11086, the SASEPDevice checks whether the Message is a SASEPDevice Synchronization Request. If the Message from SASEPDevice is a SASEPDevice Synchronization Request 11087, the SASEPDevice updates its data structures to indicate that a SASEPDevice Synchronization Request from that SASEPDevice for that operation is received. Then the SASEPDevice checks 11082 whether all the SASEPDevices which are participating in the synchronization for that operation have responded either with Negative Acknowledgment (NAK) or SASEPDevice Synchronization Request for that operation. If all those SASEPDevices have not responded, the ASEPMasterDevice will go back to the state 11014 where it awaits an ASEPManualAction from a user or a Message from a SASEPDevice. If all those SASEPDevices have responded 11083, the ASEPMasterDevice checks 11083 whether that operation is marked for discarding. If that operation not is marked for discarding 11084, the ASEPMasterDevice will send a Master Confirmation to each of those SASEPDevices which are identified for performing that operation to perform that operation and goes back to the state 11014 where it awaits an ASEPManualAction from a user or a Message from a SASEPDevice. If that operation is marked for discarding 11085, the ASEPMasterDevice will send a Master Confirmation to each of those SASEPDevices which are identified for discarding that operation to discard that operation and goes back to the state 11014 where it awaits an ASEPManualAction from a user or a Message from a SASEPDevice. If the Message from SASEPDevice is an Acknowledgment 11088 indicating that the SASEPDevice has either discarded or performed the operation as directed by the Master Confirmation from the ASEPMasterDevice, then the ASEPMasterDevice updates its data structures to indicate that an Acknowledgment (ACK) from that SASEPDevice for that operation is received. Then the ASEPMasterDevice checks 11089 whether all those SASEPDevices to which Master Confirmation for that operation was sent have responded with an Acknowledgment (ACK). When an operation is discarded, an Acknowledgment (ACK) is sent only to the ASEPMasterDevice that initiated that operation. When an operation is performed by a SASEPDevice, Acknowledgments are sent to all the ASEPMasterDevices which contain configurations or Application Security Environment States which are affected by that operation. An ASEPMasterDevice which gets an Acknowledgment for an operation which was not synchronized by that ASEPMasterDevice can identify the list of SASEPDevices to which Master Confirmations for that operation was sent as the configuration containing the list of SASEPDevices that must perform that operation is available to that ASEPMasterDevice also. If all those SASEPDevices have not responded with Acknowledgment (ACK), the ASEPMasterDevice will go back to the state 11014 where it awaits an ASEPManualAction from a user or a Message from a SASEPDevice. If all those SASEPDevices have responded 11090, the ASEPMasterDevice checks whether that operation is successful (or whether that operation is marked for discarding). If that operation is successful 11091, the ASEPMasterDevice will update its configuration with information contained in the Acknowledgments from the SASEPDevices as applicable, display a message if the ASEPMasterDevice is configured to display success for that operation and will go back to the state 11014 where it awaits an ASEPManualAction from a user or a Message from a SASEPDevice. If that operation is not successful 11092 (or is marked for discarding), the ASEPMasterDevice will display a message to the user to indicate that the operation requested by the user was discarded (along with the reason for discarding that operation) and will go back to the state 11014 where it awaits an ASEPManualAction from a user or a Message from a SASEPDevice.

The Unique Identifiers for operations can be reused after an operation is discarded or performed by all SASEPDevices and ASEPMasterDevices.

When an ASEPMasterDevice supports both, operations that require synchronization between SASEPDevices and operations that do not require synchronization between SASEPDevices, it selects the correct state machine for each operation requested by the user by performing an ASEPManualAction as per the configuration or user input.

For operations which require synchronization between SASEPDevices, ASEPMasterDevices must have a mechanism to serialize the communication of the operations requested by users by performing ASEPManualActions on different ASEPMasterDevices, so that operations can be prioritized in the same way on all the SASEPDevices which are participating in the synchronization for that operation. The solution to this issue is to allow only one ASEPMasterDevice to communicate an operation requested by a user by performing an ASEPManualAction at a time and other ASEPMasterDevices will have to wait for this communication to complete before those ASEPMasterDevices can communicate other operations. This can be achieved by ASEPMasterDevices using tokens or by ASEPMasterDevices synchronizing to allow only one of the ASEPMasterDevices to communicate a new operation at any time. There are different ways ASEPMasterDevices can synchronize:
  i. Using an ASEPMasterDevice or another device as an arbitrator for communicating new operations requested by a user by performing ASEPManualActions;
  ii. Using a token and only the ASEPMasterDevice having the token being allowed to communicate new operations requested by a user by performing ASEPManualActions and the token being passed to other ASEPMasterDevices after the communication is complete;
  iii. Using priorities between devices. When more than one ASEPMasterDevice tries to communicate new operations, the ASEPMasterDevice with the highest priority winning the arbitration and being allowed to communicate the new operation requested by a user by performing an ASEPManualAction on that ASEPMasterDevice.
  iv. Every ASEPMasterDevice that needs to communicate a new operation getting a time-stamp and the operation with the lowest time-stamp being communicated before operations with higher timestamps.
  v. Using both time-stamp and device priorities to prioritize operations.

Figure 12:
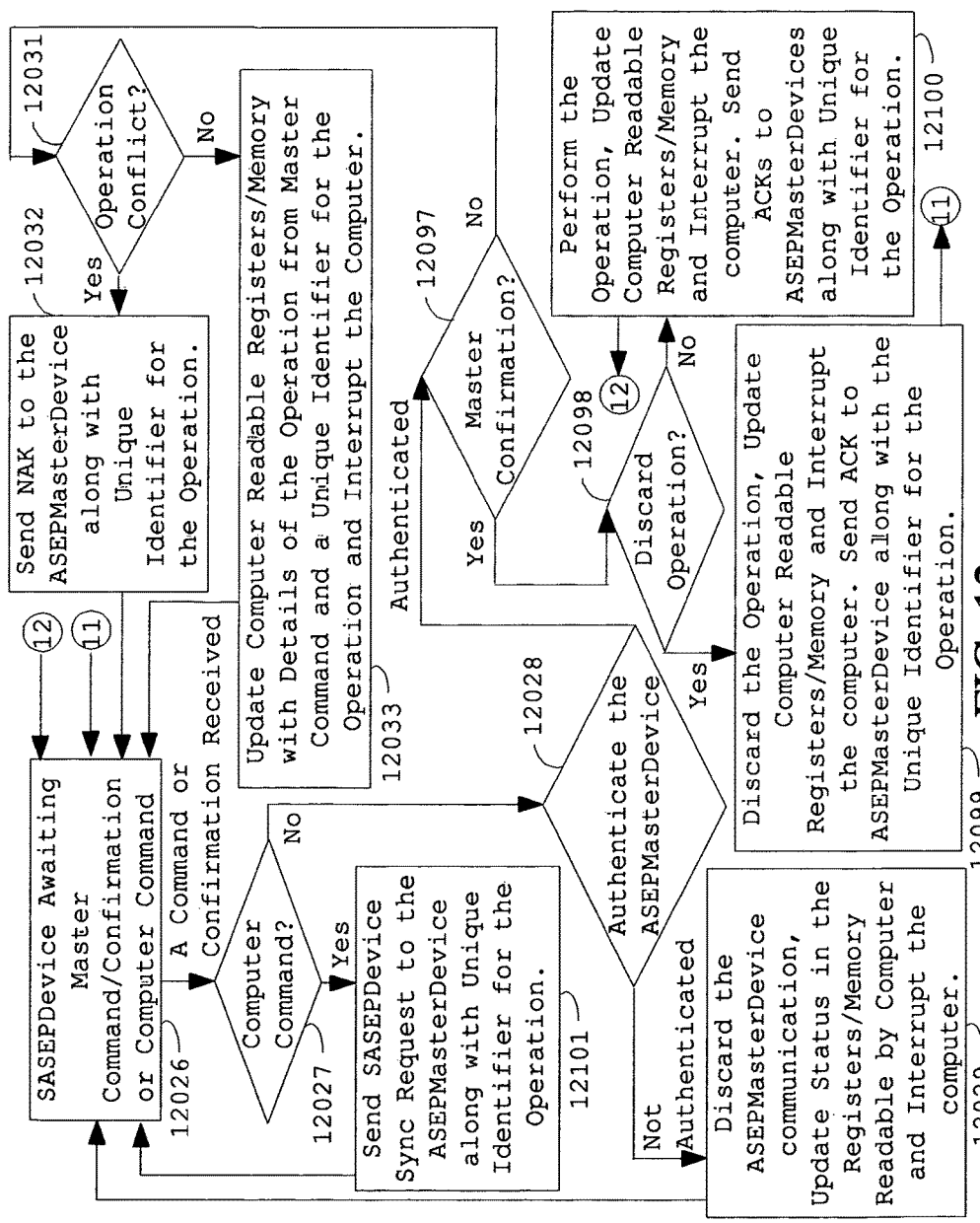
FIG. 12 illustrates an example of a state machine used by a SASEPDevice for operations that require synchronization. In this example, the synchronization of each operation is done using the ASEPMasterDevice that initiated that operation.

FIG. 12 illustrates an example of a state machine used by a SASEPDevice for operations that require synchronization. In this example, the synchronization of each operation is done using the ASEPMasterDevice that initiated that operation. The SASEPDevice in this example is capable of identifying and resolving operation conflicts. The SASEPDevice awaits 12026 either a Master Command or a Master Confirmation from one of the ASEPMasterDevices that control it or a command from the computer to which it is attached. When a command/confirmation is received by the SASEPDevice, the SASEPDevice checks 12027 whether the command/confirmation received is a computer command or a communication from an ASEPMasterDevice. When a communication from an ASEPMasterDevice is received, the SASEPDevice authenticates 12028 the ASEPMasterDevice that sent the communication. If the authentication fails 12029, the SASEPDevice discards that communication from the ASEPMasterDevice, updates registers/memory readable by the computer to which the SASEPDevice is attached with the reason for discarding the communication, interrupts the computer and returns to the state 12026 where it awaits a Master Command or a Master Confirmation or a computer command. If the ASEPMasterDevice authentication is successful 12097, the SASEPDevice checks whether it received a Master Confirmation or a Master Command from the ASEPMasterDevice. When a Master Command is received, the SASEPDevice checks 12031 whether the operation requested by the Master Command has conflicts with any of the ongoing operations. If the operation has conflicts with any of the ongoing operations 12032, the SASEPDevice sends a Negative Acknowledgment (NAK) along with the Unique Identifier for the operation to the ASEPMasterDevice that sent the Master Command and returns to the state 12026 where it awaits a Master Command or a Master Confirmation or a computer command. If the operation requested by the Master Command does not have any conflict with ongoing operations 12033, the SASEPDevice updates computer readable registers/memory with details of the operation and a Unique Identifier for that operation, interrupts the computer to which the SASEPDevice is attached and returns to the state 12026 where it awaits a Master Command or a Master Confirmation or a computer command. When a Master Confirmation from an ASEPMasterDevice is received 12098, the SASEPDevice checks whether the Master Confirmation is to discard or to perform the operation identified by the Unique Identifier. If the Master Confirmation requests the operation to be discarded 12099, the SASEPDevice discards the operation identified by the Unique Identifier, updates the registers/memory readable by the computer to which the SASEPDevice is attached with the status of the operation being discarded along with the Unique Identifier for the operation and the reason for discarding the operation, interrupts the computer, sends an Acknowledgment (ACK) along with the Unique Identifier for the operation to the ASEPMasterDevice that sent the Master Confirmation and returns to the state 12026 where it awaits a Master Command or a Master Confirmation or a computer command. If the Master Confirmation requests the operation to be performed 12100, the SASEPDevice performs the operation identified by the Unique Identifier, updates the registers/memory readable by the computer to which the SASEPDevice is attached with the status/results from the operation along with the Unique Identifier for the operation, interrupts the computer, sends an Acknowledgment (ACK) along with details and results from the operation and the Unique Identifier for the operation to each of those ASEPMasterDevices which are identified for receiving Acknowledgments (ACKs) for that operation when that operation is performed (so that the configuration and Application Security Environment States in all those ASEPMasterDevices are synchronized) and returns to the state 12026 where it awaits a Master Command or a Master Confirmation or a computer command. The list of ASEPMasterDevices to Which Acknowledgments (ACKs) are sent by a SASEPDevice for an operation contains all the ASEPMasterDevices which contain configurations or Application Security Environment States that will be affected by that operation. When a computer command is received 12101 (a computer command in this case indicates that cleanup required for an operation is completed), the SASEPDevice sends a SASEPDevice Synchronization Request for the operation identified with the Unique Identifier to the ASEPMasterDevice that requested that operation (the ASEPMasterDevice requested that operation by sending a Master Command) and returns to the state 12026 where it awaits a Master Command or a Master Confirmation or a computer command.

When a SASEPDevice supports both operations that require synchronization and operations that do not require synchronization, it selects the correct state machine for each operation as per the configuration. A Master Command can also be used to specify the state machine to be used for an operation requested by that Master Command. There are multiple options for SASEPDevice to select different state machines depending on the operation and the mechanism used for this selection is implementation specific.

Optionally, Acknowledgments to indicate that an operation is discarded can also be sent to an ASEPMasterDevice that did not initiate that operation. We do not recommend this behavior. Optionally, an ASEPMasterDevice which is synchronizing an operation can send Master Confirmations to discard that operation as soon as one of the SASEPDevices participating in synchronization for that operation sends a Negative Acknowledgment to the ASEPMasterDevice or if the user aborts the operation before the synchronization between SASEPDevices for that operation is complete. In this case, each SASEPDevice which receives that Master Confirmation marks that operation for discarding, if the ASEPSoftware is processing that operation, waits for the ASEPSoftware to complete processing that operation and then sends a Negative Acknowledgment and/or an Acknowledgment for that operation.

Preferably, the list of ASEPMasterDevice to which acknowledgments are sent after an operation is completed by a SASEPDevice is same as the list of ASEPMasterDevices that control that SASEPDevice. Optionally, an acknowledgment for an operation is sent only to the ASEPMasterDevice that sent the Master Confirmation for that operation and a message different from an acknowledgment can be sent to other ASEPMasterDevices after a SASEPDevice performs that operation.

Optionally, the list of ASEPMasterDevices to which acknowledgments are sent after an operation is performed by a SASEPDevice can be different for different operations. This option can be used when some ASEPMasterDevices that control a SASEPDevice have more limited functionality compared to other ASEPMasterDevices that control the same SASEPDevice. For example, ASEPMasterDevices owned by system administrators will have more functionalities compared to ASEPMasterDevices owned by other users. In this case, the configurations in the ASEPMasterDevices owned by system administrators can be different from the configurations in the ASEPMasterDevices owned by other users and acknowledgments for operations that affect the configuration present only in system administrators' ASEPMasterDevices need not be sent to ASEPMasterDevices owned by other users.

Each ASEPMasterDevice may control a set of SASEPDevices where the sets of SASEPDevices controlled by different ASEPMasterDevices need not be mutually exclusive. For example, an ASEPMasterDevice belonging to a system administrator may control all the SASEPDevices in a data center. The ASEPMasterDevice belonging to a user of the data center may control only a subset of all the SASEPDevices in the data center. The SASEPDevices controlled by an ASEPMasterDevice could be attached to different computers storage arrays, JBODs, storage disks, or any computer peripheral. Preferably, the SASEPDevice attached to a computer and the SASEPDevice attached to the storage attached to the computer must change to the same state corresponding to an Application Security Environment at the same time, after synchronizing with one of the ASEPMasterDevices that control them. SASEPDevices attached to different computers may have configurations that are independent and they need not synchronize operations even if they are controlled by the same ASEPMasterDevice. When an application is run on two or more computers and a storage device is shared between these computers, it is recommended that the SASEPDevices on these computers and the SASEPDevices on the shared storage, should change to the same state corresponding to an Application Security Environment, at the same time, after synchronizing with one of the ASEPMasterDevices that controls them.

The ASEPMasterDevices can compute the lists of SASEPDevices that must synchronize for doing different operations based on the list of SASEPDevices where the configuration for each user or each user group or each Application Security Environment is stored. Then the ASEPMasterDevices can configure SASEPDevices to synchronize for each operation that needs synchronization. The method used for identifying the list of SASEPDevices for synchronizing each operation is implementation specific.

When more than one ASEPMasterDevice controls a SASEPDevice, the configuration in the ASEPMasterDevices can become out of synchronization with the latest configurations in the SASEPDevice if the Acknowledgments (ACK) are not sent to all the ASEPMasterDevices in which the configurations affected by that operation are present. If SASEPDevices do not send Acknowledgments (ACK) to all the ASEPMasterDevices in which the configurations affected by that operation are present, then the SASEPDevices must allow the ASEPMasterDevices controlling those SASEPDevices to load the latest configuration. An ASEPMasterDevice may load the latest configuration when a user performs an ASEPManualAction or when it gets a message or Acknowledgment (ACK) from a SASEPDevice indicating that a configuration change or Application Security Environment State change has happened. Optionally, if SASEPDevices do not send Acknowledgments (ACK) to all the ASEPMasterDevices that control those SASEPDevices then, an ASEPMasterDevice that initiated a successful operation can send messages to other ASEPMasterDevices as applicable, after that ASEPMasterDevice gets all the Acknowledgments for that operation from the SASEPDevices so that the configuration in all the ASEPMasterDevices can be synchronized. This requires a mechanism that allows the ASEPMasterDevices to communicate with each other. Another option is that only some SASEPDevices send Acknowledgments for an operation to the ASEPMasterDevices that did not initiate that operation. The option used for synchronizing configuration and Application Security Environment State changes in ASEPMasterDevices is implementation specific.

A mechanism to load configurations from SASEPDevices or ASEPMasterDevices is needed for adding new ASEPMasterDevices and new SASEPDevices to an existing setup. Optionally, a mechanism to download configurations to SASEPDevices or to ASEPMasterDevices from other SASEPDevices or ASEPMasterDevices can also be used. Preferably, the mechanism to load the configuration or download the configuration must be supported between an ASEPMasterDevice and the SASEPDevices controlled by that ASEPMasterDevice.

The list of ASEPMasterDevices to which the Acknowledgments (ACK) for an operation should be sent by a SASEPDevice after an operation is performed can be a subset or a superset or different from the set of ASEPMasterDevices that control it.

Figure 13:
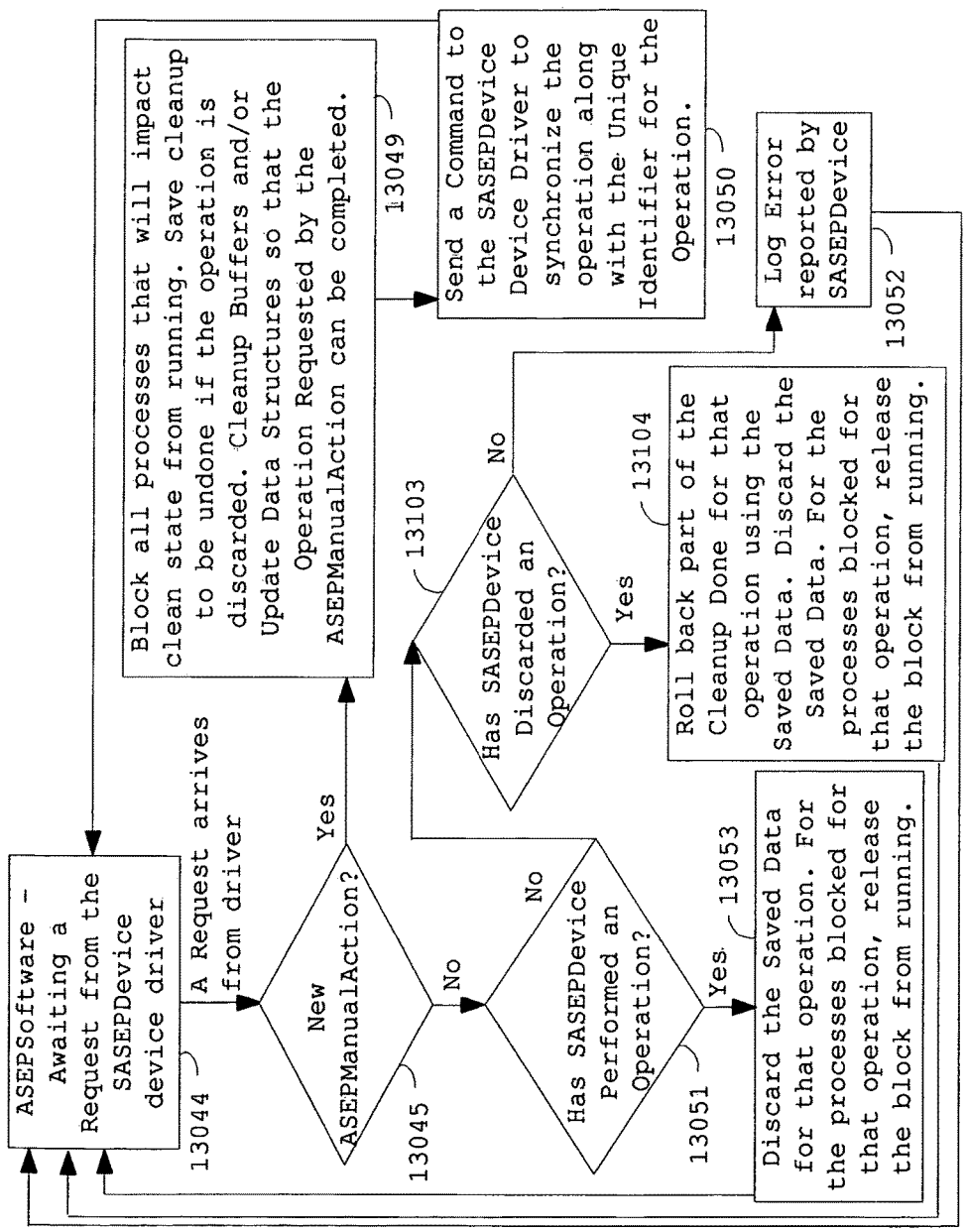
FIG. 13 illustrates an example of a state machine used by the ASEPSoftware for operations that require SASEPDevice synchronization.

FIG. 13 illustrates an example of a state machine used by the ASEPSoftware for operations that require SASEPDevice synchronization. The ASEPSoftware 13044 awaits requests from the SASEPDevice device driver. When a request from the SASEPDevice device driver arrives, the ASEPSoftware checks whether the request is for an operation corresponding to a new ASEPManualAction 13045. If the request is for an operation corresponding to a new ASEPManualAction, the ASEPSoftware performs the cleanup 13049 required to perform the operation including cleaning up of buffers and updating data structures as required. Before the cleanup is done, all the processes that will impact the clean state are blocked from running 13049. In addition to doing the cleanup 13049, the ASEPSoftware saves some data from buffers and data structures which are being cleaned up as configured so that some of the cleanup can be reversed as applicable in the event that the operation is discarded by the ASEPMasterDevice by sending a Master Confirmation to discard that operation. The ASEPSoftware may interact with other operating system modules to get the required cleanup completed. After the cleanup is completed, the ASEPSoftware sends a command 13050 to the SASEPDevice device driver along with the Unique Identifier for the operation so that the SASEPDevice can respond to the ASEPMasterDevice with a SASEPDevice Synchronization Request for that operation and the ASEPSoftware goes back to the state 13044 where it awaits a new request from the SASEPDevice device driver. In the state 13050, the ASEPSoftware does not release the not-ready-to-run state for processes that will impact the clean state. If the request from the SASEPDevice device driver is not for a new ASEPManualAction 13051, the ASEPSoftware checks whether the SASEPDevice has performed an operation. If the SASEPDevice has performed an operation 13053, the ASEPSoftware discards the data saved for reversing some of the cleanup done for that operation, for all the processes that were blocked from running for that operation to complete, the ASEPSoftware releases the block and goes back to the state 13044 where it awaits a new request from the SASEPDevice device driver. If the SASEPDevice has not performed an operation 13103, the ASEPSoftware checks whether the SASEPDevice has discarded an operation. If the SASEPDevice has discarded an operation 13104, the ASEPSoftware reverses some of the cleanup done for that operation as configured using the data saved during cleanup, discards that saved data used for reversing some of the cleanup, for all the processes that were blocked from running for that operation to complete, the ASEPSoftware releases the block and goes back to the state 13044 where it awaits a new request from the SASEPDevice device driver. If the request from the SASEPDevice device driver is to indicate that an ASEPMasterDevice that sent a Master Command or a Master Confirmation or some other message could not be authenticated, the ASEPSoftware logs 13052 the error and goes back to the state 13044 where it awaits a new request from the SASEPDevice device driver.

When the ASEPSoftware supports both operations that require synchronization and operations that do not require synchronization, it selects the correct state machine for each operation as per the configuration. The ASEPSoftware can identify which state machine is to be used for each operation either based on the configuration for that operation or based on the details of the operation sent by the SASEPDevices. There are multiple options for ASEPSoftware to select different state machines depending on the operation and the mechanism used for the selection of the state machine is implementation specific.

Optionally, an ASEPMasterDevice can support one more type of commands (or messages) which are sent to SASEPDevices after the ASEPMasterDevice receives all the Acknowledgments (ACKs) for an operation from all the SASEPDevices identified for performing or discarding that operation confirming that all those SASEPDevices have either performed or discarded that operation. In other words, this command (message) is sent after receiving Acknowledgments for an operation from all the SASEPDevices to which Master Confirmations for performing or discarding that operation were sent. Preferably, this command is communicated to the ASEPSoftware by those SASEPDevices and the ASEPSoftware can use this message to release the not-ready-to-run state for the processes/tasks blocked for that operation. This will ensure that the processes/tasks are restarted only after all the SASEPDevices that are identified for performing an operation that needs synchronization between SASEPDevices have performed that operation.

Figure 14:
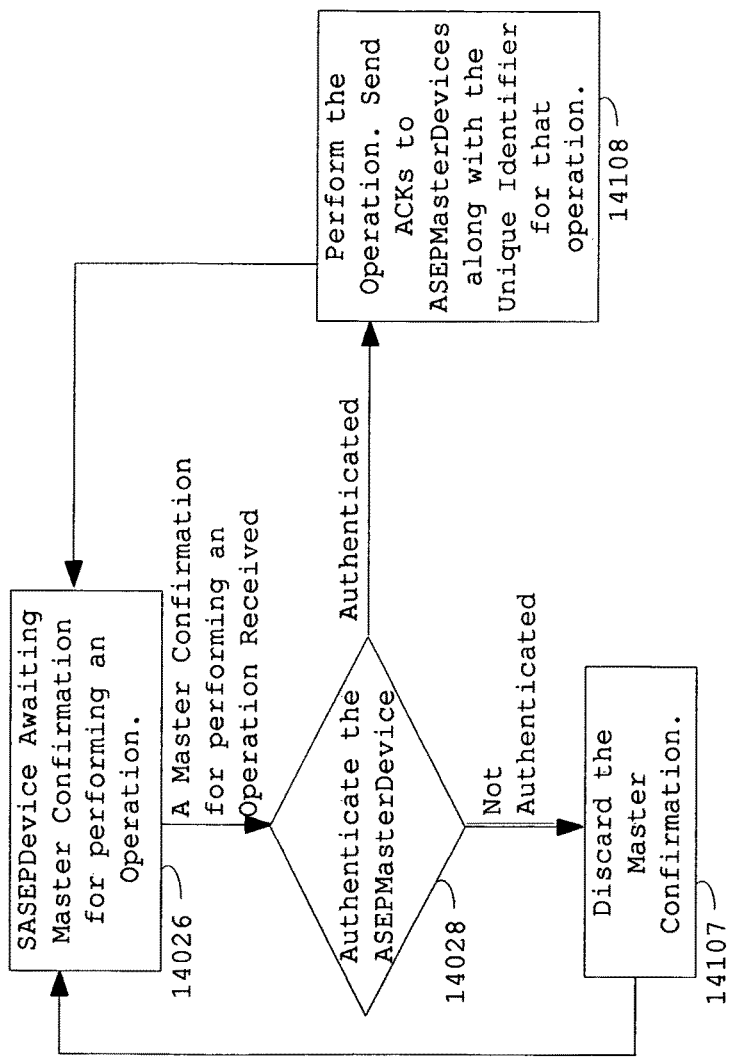
FIG. 14 illustrates an example of a state machine used by a SASEPDevice for operations that require synchronization when the SASEPDevice does not interact with ASEPSoftware and hence does not participate in SASEPDevice synchronization, but accepts a message for performing an operation from an ASEPMasterDevice after all the SASEPDevices which are required to synchronize for that operation have completed synchronization for that operation.

FIG. 14 illustrates an example of a state machine used by a SASEPDevice for operations that require synchronization when the SASEPDevice does not interact with ASEPSoftware and hence does not participate in SASEPDevice synchronization, but accepts a Master Confirmation for performing an operation from an ASEPMasterDevice after all the SASEPDevices which are required to synchronize for that operation have completed synchronization for that operation. The SASEPDevice awaits 14026 a Master Confirmation for performing an operation from one of the ASEPMasterDevices that controls it. When a Master Confirmation for performing an operation is received by the SASEPDevice, the SASEPDevice authenticates 14028 the ASEPMasterDevice that sent the Master Confirmation. If the authentication fails 14107, the SASEPDevice discards the Master Confirmation and returns to the state 14026 where it awaits a Master Confirmation for performing an operation. If the ASEPMasterDevice authentication is successful 14108, the SASEPDevice performs the operation requested by the Master Confirmation, sends an Acknowledgment (ACK) along with details and results from the operation and the Unique Identifier for the operation to each of those ASEPMasterDevices which are identified for receiving Acknowledgments (ACKs) for that operation when that operation is performed (so that the configuration and Application Security Environment States in all those ASEPMasterDevices are synchronized) and goes back to the state 14026 where it awaits a Master Confirmation to perform an operation.

When a SASEPDevice supports both operations that do not require synchronization and Master Confirmations to perform operations, it selects the correct state machine for each operation as per the configuration. A Master Command or Master Confirmation can also be used to specify the state machine to be used for an operation requested by that Master Command or that Master Confirmation. There are multiple options for a SASEPDevice to select different state machines depending on the operation and the mechanism used for the selection of a state machine for an operation is implementation specific.

Preferably, a SASEPDevice sends acknowledgments after performing an operation to all the ASEPMasterDevices that control that SASEPDevice. Optionally, the SASEPDevice which does not interact with the ASEPSoftware can send an Acknowledgment only to the ASEPMasterDevice that initiated that operation. In this case, different ASEPMasterDevices will get Acknowledgments (ACK) for an operation from different sets of SASEPDevices even if these ASEPMasterDevices control all the SASEPDevices which are doing that operation. The ASEPMasterDevice on which that operation was initiated will receive Acknowledgments (ACKs) from a list of SASEPDevices which includes all the SASEPDevices which are identified for performing that operation. All the other ASEPMasterDevices will receive Acknowledgments (ACKs) from a list of SASEPDevices which includes all the SASEPDevices which are identified for synchronizing for that operation.

There are different ways to create lists of SASEPDevices to which Master Commands for initiating synchronization and/or Master Confirmations to discard operations should be sent and how the processing of these requests can be done by SASEPDevices. Optionally, an ASEPMasterDevice can send a Master Command for initiating synchronization and/or can send a Master Confirmation to discard an operation to a SASEPDevice which need not do synchronization that operation. In this case, that SASEPDevice can be configured to respond immediately with SASEPDevice Synchronization Requests (as no cleanup is required) and optionally, to save information from these requests. The state machine in a SASEPDevice to be used for handling Master Commands for initiating synchronization and/or Master Confirmations to discard operations is implementation specific.

Some ASEPMasterDevices may allow a user to modify the list of SASEPDevices which must synchronize for an operation or the list of operations that do not need synchronization or the list of SASEPDevices to which Master Confirmations for performing an operation must be sent or the list of SASEPDevices to which Master Confirmations for discarding an operation must be sent by performing ASEPManualActions. But the recommended option is that ASEPMasterDevices compute these lists if possible based on the configuration and based on whether the SASEPDevices are connected directly to computers or not.

Some ASEPMasterDevices may allow a privileged user to abort some ongoing operations initiated using that ASEPMasterDevice. Some ASEPMasterDevices may allow a user to abort some ongoing operations initiated using that ASEPMasterDevice by that user. If that operation requires synchronization between SASEPDevices and Master Confirmations for that operation are not sent, then that ASEPMasterDevice can mark that operation for discarding. We recommend that if Master Confirmations for an operation are already sent by the ASEPMasterDevice, the ASEPMasterDevice must discard requests to abort that operation. We also recommend that the ASEPMasterDevices must discard the requests to abort an operation that does not require synchronization between SASEPDevices.

Figure 15:
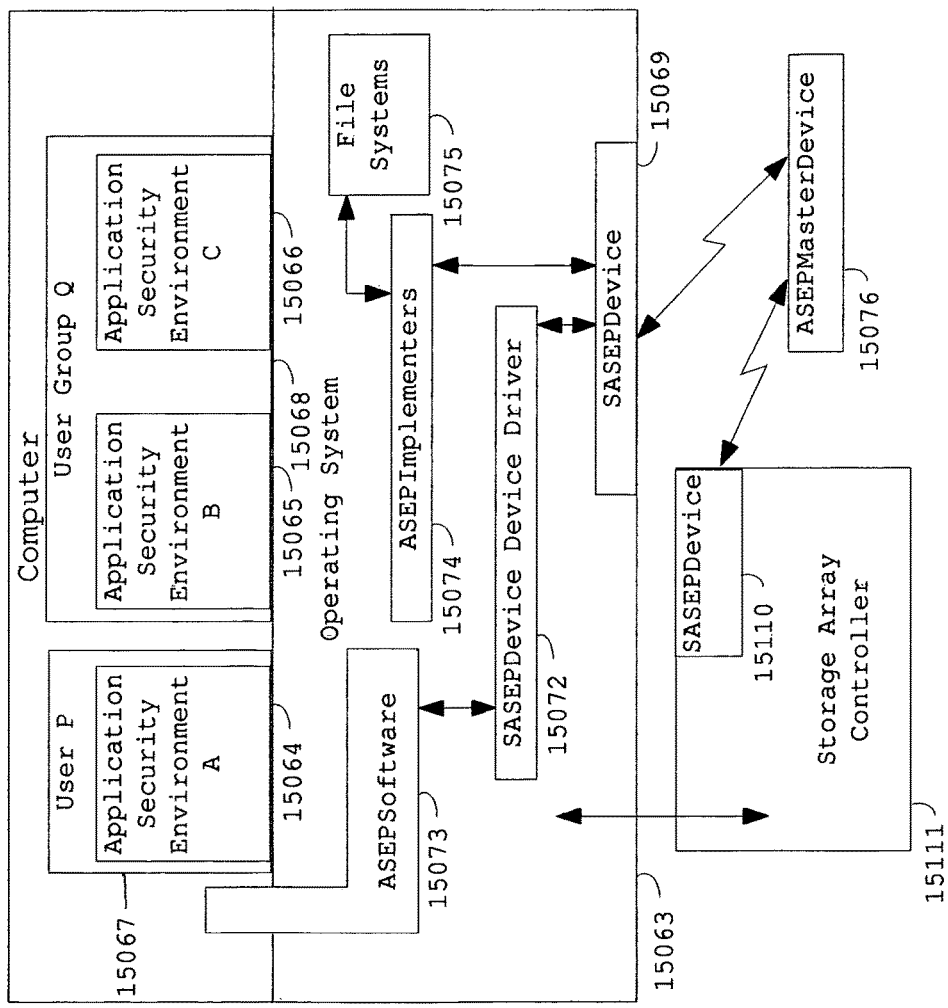
FIG. 15 illustrates an example of how different components in a computer interact when used with an ASEPMasterDevice and a SASEPDevice which allow some configuration changes and Application Security Environment State Changes to be synchronized between different SASEPDevices.

FIG. 15 illustrates an example of how different components in a computer 15063 interact when used with an ASEPMasterDevice and a SASEPDevice which allow some configuration changes and Application Security Environment State Changes to be synchronized between different SASEPDevices. The computer has an Application Security Environment A 15064 which is owned by User P 15067 and Application Security Environments B 15065 and C 15066 which are owned by User Group Q 15068. A SASEPDevice 15069 which is controlled by an ASEPMasterDevice 15076 is attached to the computer 15063. The SASEPDevice 15069 synchronizes configuration and Application Security Environment State changes with the help of the ASEPMasterDevice 15076 so that the configuration and Application Security Environment State changes in all the SASEPDevices controlled by the ASEPMasterDevice 15076 are synchronized. Another SASEPDevice 15110 which is controlled by the ASEPMasterDevice 15076 is attached to a storage array 15111 so that the storage array firmware can read the SASEPDevice registers and implement protection according to the configuration stored in the SASEPDevice and the current state of the Application Security Environments. Since the SASEPDevice 15110 is not attached to a computer, it does not take part in cleanup or send SASEPDevice Synchronization Requests. This SASEPDevice 15110 updates the configuration and switches to a new Application Security Environment State when directed by one of the ASEPMasterDevices which controls it. The computer 15063 is connected to the storage array 15111. The SASEPDevice 15069 is also controlled by a SASEPDevice device driver 15072. The SASEPDevice device driver 15072 passes requests from the SASEPDevice 15069 to the ASEPSoftware 15073 and commands from the ASEPSoftware 15073 to the SASEPDevice 15069. Most of the ASEPSoftware is part of the operating system. A part of the ASEPSoftware which writes errors to log files is part of the user space. ASEPImplementers 15074 enforce access control by reading the SASEPDevice 15069 registers/memory. File systems 15075 interact with the ASEPImplementers 15074 to get Application Security Environment tags.

Optionally, the access restrictions associated with each state of an Application Security Environment is independent of access restrictions associated with other states of the same Application Security Environment. Preferably, access restrictions are such that there are dependencies between access restrictions corresponding to some or all of the states corresponding to an Application Security Environment. This could be achieved by using a bit map as a state where each bit corresponds to a set of privileges and the privileges are enabled or disabled depending on whether the corresponding bit is one or zero. Optionally, the access restrictions for the next state can be created by ANDing or ORing the access restrictions corresponding to the previous state with the access restrictions corresponding to a new selection. Hence, access restrictions may have dependencies on previous states.

Optionally, every process or task or thread can belong to a separate Application Security Environment. In this case, a process identifier or a task identifier or a thread identifier could be used to uniquely identify an Application Security Environment. This may require a user to identify an available process or task identifier, create an Application Security Environment having this identifier and then create a process or task in this Application Security Environment with the same identifier. This implementation requires an operating system that allows a user to select process or task identifiers.

Optionally, ASEPMasterDevices and SASEPDevices controlled by these ASEPMasterDevices are such that these devices allow an ASEPManualAction to change the privileges of an Application Security Environment and do not use Application Security Environment States.

Optionally, there should be an option for users to set a timeout for an ASEPManualAction. At the end of the timeout, if the operation has not been completed, then the user may either let the operation continue or abort the operation.

When an operation requested by a process or task or thread in an Application Security Environment is not permitted by the current state of that Application Security Environment, the process or the task or the thread that attempted to do that privileged operation is put in an error state. The operating system will take appropriate action such as terminating the process or task depending on the error.

Preferably, all or part of the code for the ASEPSoftware, the ASEPImplementers, file system components that use Application Security Environment tags and SASEPDevice device drivers should be kept in Read-Only memory or in memory pages which are write protected to further improve protection. The write protected memories may be a ROM or may be pages or areas of memories marked not writable by an operating system loader; No software including the operating systems running on the computer or a peripheral device or an external device should be allowed to change the write protection status for these pages or areas of memories or be allowed to write into these pages or areas of memories.

Some of the access protection in a computer which is attached to one or more SASEPDevices may be implemented by software other than ASEPImplementers.

If a system allows the configuration to be modified without a user performing an ASEPManualAction, then only the privileged users must have write access to the portion of the configuration containing the list of users supported by each SASEPDevice, the list of users supported by each ASEPMasterDevice, the list of user groups supported by each SASEPDevice, the list of user groups supported by each ASEPMasterDevice, the list of users in each user group and the privileges of users and user groups. In this case, preferably, the write access to this portion of the configuration must be protected by one or more ASEPImplementers.

If a system allows the configuration to be modified without users performing ASEPManualActions then preferably, only a user should have write access to the configuration of each of the Application Security Environments owned by that user. In this case, preferably, the write access to that portion of the configuration must be protected by one or more ASEPImplementers.

If a system allows the configuration to be modified without users performing ASEPManualActions then preferably, only the members of a user group should have write access to the configuration of each of the Application Security Environments owned by that user group. In this case, preferably, the write access to that portion of the configuration must be protected by one or more ASEPImplementers.

Optionally, some privileged users may have write access to the configuration for other users or to the configurations for groups in which they are not members. In this case, all users need not have write access to configurations. In other words, if privileged users have the privilege to create Application Security Environments and Application Security Environment States for other users, some users need not have the privilege to create Application Security Environments owned by themselves or owned by groups in which they are members.

Preferably, the configuration corresponding to a user or a user group can be fetched using the identifier of the user or the user group. Similarly, the configuration corresponding to an Application Security Environment can be fetched using the identifier of the Application Security Environment. If the device that stores the configuration is a memory or mass-memory devices it is preferable to have a mapping from the identifier of the user/user-group/Application Security Environment to the memory address where the corresponding configuration is stored.

The next state of an Application Security Environment requested by an operation can be hidden from the computer to which a SASEPDevice is attached until the operation is completed. To change the state corresponding to an Application Security Environment, the SASEPDevice can update computer readable registers/memory (which preferably are not writable by the computer) with the identifier of the Application Security Environment, an identifier to identify the state change operation and a unique identifier for the operation and interrupt the computer using a hardware interrupt. Since the new state of an Application Security Environment requested by the ASEPManualAction is not communicated to the computer, no malicious software can control the state of the SASEPDevice corresponding to an Application Security Environment.

The configuration can be kept in SASEPDevice registers/memory which are not writable by the computer to which a SASEPDevice is attached. Since the configuration is kept in registers/memory not writable by software, no malicious software can modify the configuration. This way, highly secure Application Security Environments can be created.

Optionally, an Application Security Environment State corresponds to a set of privileges that the processes/tasks running in the Application Security Environment have while that Application Security Environment is in that state. In this case, an Application Security Environment State is virtual and it is the same as the privileges that the processes/tasks running in the Application Security Environment have while that Application Security Environment is in that state.

Optionally, the effective state of an Application Security Environment can be a combination of the state of a user as proposed in U.S. patent application Ser. Nos. 11/514,807, 11/515,619 and 11/519,178 and the state of an Application Security Environment.

Optionally, the privileges corresponding to an Application Security Environment can be obtained by ANDing the privileges corresponding to a user state and the privileges corresponding to an Application Security Environment State.

Optionally, where privileges are a function of the user state, an Application Security Environment can have a fixed set of privileges and need not have multiple states.

Optionally, the configuration can be such that an Application Security Environment State Mapping identifies a set of access restrictions or lack of privileges that the processes/tasks running in an Application Security Environment have while that Application Security Environment is in that state.

Optionally, the configuration can be such that an Application Security Environment State Mapping identifies a set of both privileges and access restrictions that the processes/tasks running in the Application Security Environment have while that Application Security Environment is in that state.

Preferably, an ASEPMasterDevice allows scripting and the ASEPMasterDevice can emulate ASEPManualActions as directed by scripts. Optionally, scripts can direct an ASEPManualAction to be emulated by an ASEPMasterDevice at periodic intervals or at a specified date and time.

Some devices may have a subset of the functionality of the SASEPDevices. Some implementations may allow the configuration for users and/or user groups and/or Application Security Environments to be kept in a device which does not support Application Security Environment States. An example of the functionality of such a device which is attached to a computer is:
  i. The device is controlled by one or more master devices and preferably, these master devices that control that device support user authentication and
  ii. The device contains all of part of the configuration for users and/or user groups and/or Application Security Environments and the device allows manual actions on the master devices that control that device to create/delete/modify that configuration and/or allows uploading and/or downloading of that configuration and
  iii. Preferably, the computer readable registers and/or memory in that device which contains all or part of the configuration for users and/or user groups and/or Application Security Environments including privileges for users and/or user groups and/or Application Security Environments are not writable by the computer.

Some implementations may allow a device which supports a subset of the functionalities of a SASEPDevice and an ASEPMasterDevice and does not support Application Security Environment States. An example of the functionality of such a device which is attached to a computer is:
  i. The device contains all of part of the configuration for users and/or user groups and/or Application Security Environments and the device allows manual actions by users to create/delete/modify that configuration and/or allows uploading and/or downloading of that configuration and
  ii. Preferably, the device supports user authentication and
  iii. Preferably, the computer readable registers and/or memory in that device which contains all or part of the configuration for users and/or user groups and/or Application Security Environments including privileges for users and/or user groups and/or Application Security Environments are not writable by the computer.

Some devices may have a subset of the functionality of SASEPDevices. Some implementations may allow the configuration for users and/or user groups to be kept in a device which does not support Application Security Environments. An example of the functionality of such a device which is attached to a computer is:
  i. The device is controlled by one or more master devices and preferably, these master devices that control that device support user authentication and
  ii. The device contains all of part of the configuration for users and/or user groups and the device allows manual actions on the master devices that control that device to create/delete/modify that configuration and/or allows uploading and/or downloading of that configuration and
  iii. Preferably, the computer readable registers and/or memory in that device which contains all or part of the configuration for users and/or user groups including privileges for users and/or user groups are not writable by the computer.

Some implementations may allow a device which supports a subset of the functionalities of a SASEPDevice and an ASEPMasterDevice and does not support Application Security Environments. An example of the functionality of such a device which is attached to a computer is:
  i. The device contains all of part of the configuration for users and/or user groups and the device allows manual actions by users to create/delete/modify that configuration and/or allows uploading and/or downloading of that configuration and
  ii. Preferably, the device supports user authentication and
  iii. Preferably, the computer readable registers and/or memory in that device which contains all or part of the configuration for users and/or user groups including privileges for users and/or user groups are not writable by the computer.

Optionally, ASEPMasterDevices can control a set of master devices which in turn control a set of SASEPDevices. Optionally, a number of devices can be used such that the first level devices are controlled by one or more ASEPMasterDevices, the second level devices are controlled by the first level devices and the third-level devices are controlled by the second level devices and so on and the last level devices control one or more SASEPDevices; Optionally, some of these devices in these levels can also act as ASEPMasterDevices. Optionally, none or one or more levels of devices can be supported.

Some implementations can use a device that supports many states, manual actions to change these states and does not support users or Application Security Environments. These states of the device can be mapped by a software to different sets of privileges and/or access restrictions for different users and/or Application Security Environments. Preferably, this device supports user authentication. Preferably, this device is attached to a computer or this device controls one or more devices attached to computers.

What is claimed is:

1. A method implemented in a first apparatus implemented in hardware for controlling users in a first plurality of second apparatuses, wherein configuration of at least a first user of said first plurality of second apparatuses is to be stored in a second plurality of third apparatuses if said first user is created, said method comprising:
   a) sending a first command to each apparatus in said second plurality of third apparatuses to create said first user;
   b) receiving either a first synchronisation message or a first negative acknowledgement for said first command from each apparatus in said second plurality of third apparatuses;
   c) sending a second command to each apparatus in said second plurality of third apparatuses to discard said first command to create said first user if said first negative acknowledgement is received from at least one apparatus in said second plurality of third apparatuses, wherein each apparatus in said second plurality of third apparatuses discards said first command to create said first user when said second command is received; and
   d) sending a third command to each apparatus in said second plurality of third apparatuses to complete operation specified in said first command to create said first user if said first synchronisation message is received from each apparatus in said second plurality of third apparatuses, wherein each apparatus in said second plurality of third apparatuses updates said configuration to create said first user when said third command is received.

2. The method of claim 1 further comprising: receiving manual action from a second user to create said first user of said first plurally of second apparatuses before said first command is sent to each apparatus in said second plurality of third apparatuses.

3. The method of claim 2, wherein software running in each apparatus in said first plurality of second apparatuses cannot delete said first user.

4. The method of claim 2 further comprising: sending a seventh command to each apparatus in said second plurality of third apparatuses to create a fourth user of said first plurality of second apparatuses.

5. The method of claim 1 further comprising:
   a) sending a fourth command to each apparatus in said second plurality of third apparatuses to assign privileges to a third user;
   b) receiving either a second synchronisation message or a second negative acknowledgement for said fourth command from each apparatus in said second plurality of third apparatuses;
   c) sending a fifth command to each apparatus in said second plurality of third apparatuses to discard said fourth command to assign privileges to said third user if said second negative acknowledgement is received from at least one apparatus in said second plurality of third apparatuses, wherein each apparatus in said second plurality of third apparatuses discards said fourth command to assign privileges to said third user when said fifth command is received; and
   d) sending a sixth command to each apparatus in said second plurality of third apparatuses to complete operation specified in said fourth command to assign privileges to said third user if said second synchronisation message is received from each apparatus in said second plurality of third apparatuses, wherein each apparatus in said second plurality of third apparatuses updates said configuration to assign privileges to said third user when said sixth command is received.

* * * * *